(12) United States Patent
Ohide

(10) Patent No.: US 6,917,374 B2
(45) Date of Patent: Jul. 12, 2005

(54) IMAGE FORMING APPARATUS HAVING AN EXPOSURE DEVICE CHANGING PULSE WIDTH OF A LIGHT BEAM BASED ON PATTERN DATA OF AN IMAGE

(75) Inventor: Toshio Ohide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 102 days.

(21) Appl. No.: 10/389,982

(22) Filed: Mar. 18, 2003

(65) Prior Publication Data

US 2003/0210319 A1 Nov. 13, 2003

(30) Foreign Application Priority Data

Mar. 20, 2002 (JP) ........................................ 2002-078091
Jun. 21, 2002 (JP) ........................................ 2002-181824

(51) Int. Cl.⁷ ............................................... B41J 2/447
(52) U.S. Cl. ....................................................... 347/131
(58) Field of Search ................................ 347/130, 131, 347/114–118

(56) References Cited

U.S. PATENT DOCUMENTS

| 5,294,996 A | 3/1994 | Sobue |
| 5,309,177 A | 5/1994 | Shoji et al. |
| 6,184,916 B1 | 2/2001 | Cianciosi |
| 6,198,521 B1 | 3/2001 | Oh-Ide |
| 6,233,030 B1 | 5/2001 | Oh-Ide et al. |

FOREIGN PATENT DOCUMENTS

JP 2002-361930 * 12/2002 ............... B41J/2/44

* cited by examiner

Primary Examiner—Huan Tran
(74) Attorney, Agent, or Firm—Oblon, Spivak, McClelland, Maier & Neustadt, P.C.

(57) ABSTRACT

An image forming apparatus using a multi-scan system is capable of forming an image at a high speed. An exposure device scans a surface of the photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other. A code of a plurality of levels is produced from image data in accordance with a pattern detection matrix. A pulse with output from the pattern detection processing means is produced with reference to pulse width data which designates a pulse width of each light beam previously set in response to the code.

38 Claims, 31 Drawing Sheets

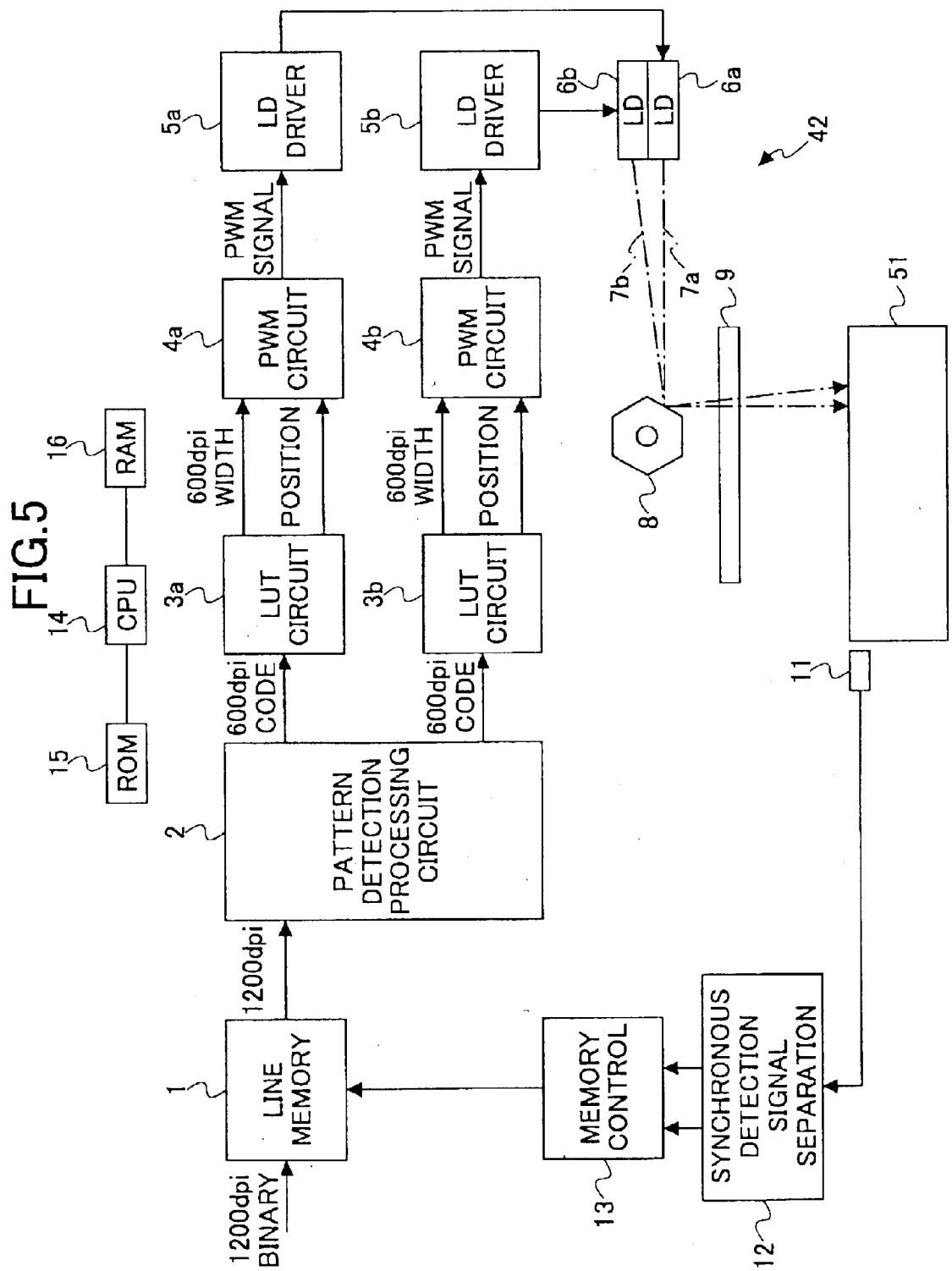

FIG.6

| | | \multicolumn{8}{c}{RIGHT COLUMN} | | | | | | | |
|---|---|---|---|---|---|---|---|---|---|
| | | ▢ | ▮ | ◪ | ▮ | ▤ | ◪ | ◩ | ▮ |
| LEFT COLUMN | ▢ | L=0, R=0 | L=0, R=1 | L=0, R=2 | L=0, R=3 | L=0, R=1 | L=0, R=2 | L=0, R=3 | L=0, R=4 |
| | ▯ | L=1, R=0 | L=1, R=1 | L=1, R=2 | L=1, R=3 | L=1, R=1 | L=1 R=2 | L=1, R=3 | L=1, R=4 |
| | ◪ | L=2, R=0 | L=2, R=1 | L=2, R=2 | L=2, R=3 | L=2, R=1 | L=2, R=2 | L=2, R=3 | L=2, R=4 |
| | ▮ | L=3, R=0 | L=3, R=1 | L=3, R=2 | L=3, R=3 | L=3, R=1 | L=3, R=2 | L=3, R=3 | L=3, R=4 |
| | ▤ | L=1, R=0 | L=1, R=1 | L=1, R=2 | L=1, R=3 | L=1, R=1 | L=1, R=2 | L=1, R=3 | L=1, R=4 |
| | ◪ | L=2, R=0 | L=2, R=1 | L=2, R=2 | L=2, R=3 | L=2, R=1 | L=2, R=2 | L=2, R=3 | L=2, R=4 |
| | ◩ | L=3, R=0 | L=3, R=1 | L=3, R=2 | L=3, R=3 | L=3, R=1 | L=3, R=2 | L=3, R=3 | L=3, R=4 |
| | ▮ | L=4, R=0 | L=4, R=1 | L=4, R=2 | L=4, R=3 | L=4, R=1 | L=4, R=2 | L=4, R=3 | L=4, R=4 |

FIG.7

| PULSE CODE C | PULSE WIDTH W |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 255 |

FIG.8

| | | R | | | | |
|---|---|---|---|---|---|---|
| | | 0 | 1 | 2 | 3 | 4 |
| L | 0 | 128 | 127 | 127 | 127 | 127 |
| | 1 | 96 | 96 | 95 | 95 | 95 |
| | 2 | 64 | 64 | 64 | 63 | 63 |
| | 3 | 32 | 32 | 32 | 32 | 31 |
| | 4 | 0 | 0 | 0 | 0 | 0 |

FIG.10A

IMAGE PATTERN

|    | x0 | x1 | x2 | x3 | x4 |
|----|----|----|----|----|----|
| y0 |    |    |    |    |    |
| y1 |    |    |    |    |    |
| y2 |    |    |    |    |    |

WIDTH CODE

| x0 | x1 | x2 | x3 | x4 |     |
|----|----|----|----|----|-----|
| 4  | 4  | 4  | 4  | 4  | LD0 |
| 0  | 0  | 0  | 0  | 0  | LD1 |
| 0  | 0  | 0  | 0  | 0  | LD0 |

FIG.10B

IMAGE PATTERN

|    | x0 | x1 | x2 | x3 | x4 |
|----|----|----|----|----|----|
| y0 |    |    |    |    |    |
| y1 |    |    |    |    |    |
| y2 |    |    |    |    |    |

WIDTH CODE

| x0 | x1 | x2 | x3 | x4 |     |
|----|----|----|----|----|-----|
| 2  | 2  | 2  | 2  | 2  | LD0 |
| 2  | 2  | 2  | 2  | 2  | LD1 |
| 0  | 0  | 0  | 0  | 0  | LD0 |

FIG.10C

IMAGE PATTERN

| | x0 | x1 | x2 | x3 | x4 |
|---|---|---|---|---|---|
| y0 | | | | | |
| y1 | | | | | |
| y2 | | | | | |

WIDTH CODE

| x0 | x1 | x2 | x3 | x4 | |
|---|---|---|---|---|---|
| 0 | 0 | 0 | 0 | 0 | LD0 |
| 4 | 4 | 4 | 4 | 4 | LD1 |
| 0 | 0 | 0 | 0 | 0 | LD0 |

FIG.10D

IMAGE PATTERN

| | x0 | x1 | x2 | x3 | x4 |
|---|---|---|---|---|---|
| y0 | | | | | |
| y1 | | | | | |
| y2 | | | | | |

WIDTH CODE

| x0 | x1 | x2 | x3 | x4 | |
|---|---|---|---|---|---|
| 0 | 0 | 0 | 0 | 0 | LD0 |
| 2 | 2 | 2 | 2 | 2 | LD1 |
| 2 | 2 | 2 | 2 | 2 | LD0 |

FIG.11A

IMAGE PATTERN

WIDTH CODE

|  | x0 | x1 | x2 | x3 | x4 |  |
|---|---|---|---|---|---|---|
| | 6 | 6 | 6 | 6 | 6 | LD0 |
| | 6 | 6 | 6 | 6 | 6 | LD1 |
| | 0 | 0 | 0 | 0 | 0 | LD0 |
| | 0 | 0 | 0 | 0 | 0 | LD1 |

FIG.11B

IMAGE PATTERN

WIDTH CODE

|  | x0 | x1 | x2 | x3 | x4 |  |
|---|---|---|---|---|---|---|
| | 2 | 2 | 2 | 2 | 2 | LD0 |
| | 8 | 8 | 8 | 8 | 8 | LD1 |
| | 2 | 2 | 2 | 2 | 2 | LD0 |
| | 0 | 0 | 0 | 0 | 0 | LD1 |

FIG.11C

IMAGE PATTERN

| | x0 | x1 | x2 | x3 | x4 |
|---|---|---|---|---|---|
| y0 | | | | | |
| y1 | ■ | ■ | ■ | ■ | ■ |
| y2 | ■ | ■ | ■ | ■ | ■ |
| y3 | | | | | |

WIDTH CODE

| x0 | x1 | x2 | x3 | x4 | |
|---|---|---|---|---|---|
| 0 | 0 | 0 | 0 | 0 | LD0 |
| 6 | 6 | 6 | 6 | 6 | LD1 |
| 6 | 6 | 6 | 6 | 6 | LD0 |
| 0 | 0 | 0 | 0 | 0 | LD1 |

FIG.11D

IMAGE PATTERN

| | x0 | x1 | x2 | x3 | x4 |
|---|---|---|---|---|---|
| y0 | | | | | |
| y1 | | | | | |
| y2 | ■ | ■ | ■ | ■ | ■ |
| y3 | | | | | |

WIDTH CODE

| x0 | x1 | x2 | x3 | x4 | |
|---|---|---|---|---|---|
| 0 | 0 | 0 | 0 | 0 | LD0 |
| 2 | 2 | 2 | 2 | 2 | LD1 |
| 8 | 8 | 8 | 8 | 8 | LD0 |
| 2 | 2 | 2 | 2 | 2 | LD1 |

FIG.12A

IMAGE PATTERN

WIDTH CODE

|  | x0 | x1 | x2 | x3 | x4 |  |
|---|---|---|---|---|---|---|
| y0 | 4 | 0 | 4 | 0 | 4 | LD0 |
| y1 | 0 | 0 | 0 | 0 | 0 | LD1 |
| y2 | 0 | 4 | 0 | 4 | 0 | LD0 |

FIG.12B

IMAGE PATTERN

WIDTH CODE

|  | x0 | x1 | x2 | x3 | x4 |  |
|---|---|---|---|---|---|---|
| y0 | 1 | 1 | 1 | 1 | 1 | LD0 |
| y1 | 1 | 1 | 1 | 1 | 1 | LD1 |
| y2 | 1 | 1 | 1 | 1 | 1 | LD0 |

FIG.13A

IMAGE PATTERN

|    | x0 | x1 | x2 | x3 | x4 |
|----|----|----|----|----|----|
| y0 |    |    |    |    |    |
| y1 |    |    |    |    |    |
| y2 |    |    |    |    |    |

WIDTH CODE

| x0 | x1 | x2 | x3 | x4 |     |
|----|----|----|----|----|-----|
| 4  | 0  | 4  | 0  | 4  | LD0 |
| 2  | 0  | 2  | 0  | 2  | LD1 |
| 0  | 4  | 0  | 4  | 0  | LD0 |

FIG.13B

IMAGE PATTERN

|    | x0 | x1 | x2 | x3 | x4 |
|----|----|----|----|----|----|
| y0 |    |    |    |    |    |
| y1 |    |    |    |    |    |
| y2 |    |    |    |    |    |

WIDTH CODE

| x0 | x1 | x2 | x3 | x4 |     |
|----|----|----|----|----|-----|
| 5  | 0  | 5  | 0  | 5  | LD0 |
| 0  | 1  | 0  | 1  | 0  | LD1 |
| 0  | 5  | 0  | 5  | 0  | LD0 |

FIG.13C

IMAGE PATTERN

|    | x0 | x1 | x2 | x3 | x4 |
|----|----|----|----|----|----|
| y0 |    |    |    |    |    |
| y1 |    |    |    |    |    |
| y2 |    |    |    |    |    |
| y3 |    |    |    |    |    |

WIDTH CODE

| x0 | x1 | x2 | x3 | x4 |     |
|----|----|----|----|----|-----|
| 1  | 0  | 1  | 0  | 1  | LD0 |
| 5  | 0  | 5  | 0  | 5  | LD1 |
| 0  | 1  | 0  | 1  | 0  | LD0 |
| 0  | 5  | 0  | 5  | 0  | LD1 |

FIG.14A

IMAGE PATTERN

WIDTH CODE

| | x0 | x1 | x2 | x3 | x4 | |
|---|---|---|---|---|---|---|
| y0 | 4 | 0 | 4 | 0 | 4 | LD0 |
| y1 | 6 | 0 | 6 | 0 | 6 | LD1 |
| y2 | 0 | 4 | 0 | 4 | 0 | LD0 |

FIG.14B

IMAGE PATTERN

WIDTH CODE

| | x0 | x1 | x2 | x3 | x4 | |
|---|---|---|---|---|---|---|
| y0 | 7 | 0 | 7 | 0 | 7 | LD0 |
| y1 | 2 | 1 | 2 | 1 | 2 | LD1 |
| y2 | 0 | 7 | 0 | 7 | 0 | LD0 |

FIG.14C

IMAGE PATTERN

WIDTH CODE

| | x0 | x1 | x2 | x3 | x4 | |
|---|---|---|---|---|---|---|
| y0 | 1 | 2 | 1 | 2 | 1 | LD0 |
| y1 | 7 | 0 | 7 | 0 | 7 | LD1 |
| y2 | 2 | 1 | 2 | 1 | 2 | LD0 |

FIG. 21A

IMAGE PATTERN

|    | x0 | x1 | x2 | x3 | x4 |
|----|----|----|----|----|----|
| y0 | ■  |    |    | ■  |    |
| y1 | ■  |    |    | ■  |    |

WIDTH CODE

|    | x0 | x1 | x2 | x3 | x4 |
|----|----|----|----|----|----|
|    | 8  | 0  | 0  | 8  | 0  |
|    | 8  | 0  | 0  | 8  | 0  |

FIG. 21B

IMAGE PATTERN

|    | x0 | x1 | x2 | x3 | x4 |
|----|----|----|----|----|----|
| y0 |    | ■  |    |    | ■  |
| y1 |    | ■  |    |    | ■  |

WIDTH CODE

|    | x0 | x1 | x2 | x3 | x4 |
|----|----|----|----|----|----|
|    | 4  | 4  | 0  | 4  | 4  |
|    | 4  | 4  | 0  | 4  | 4  |

FIG. 22A

IMAGE PATTERN

|    | x0 | x1 | x2 | x3 | x4 |
|----|----|----|----|----|----|
| y0 | ■■■■■■■■■■■■■■■■■■■■ |
| y1 |    |    |    |    |    |

WIDTH CODE

|    | x0 | x1 | x2 | x3 | x4 |
|----|----|----|----|----|----|
|    | 4  | 4  | 4  | 4  | 4  |
|    | 0  | 0  | 0  | 0  | 0  |

FIG. 22B

IMAGE PATTERN

|    | x0 | x1 | x2 | x3 | x4 |
|----|----|----|----|----|----|
| y0 |    |    |    |    |    |
| y1 | ■■■■■■■■■■■■■■■■■■■■ |

WIDTH CODE

|    | x0 | x1 | x2 | x3 | x4 |
|----|----|----|----|----|----|
|    | 2  | 2  | 2  | 2  | 2  |
|    | 2  | 2  | 2  | 2  | 2  |

FIG.24A

IMAGE PATTERN

|  | x0 | x1 | x2 | x3 | x4 |
|---|---|---|---|---|---|
| y0 | ■ |  | ■ |  | ■ |
| y1 |  |  |  |  |  |
| y2 |  | ■ |  | ■ |  |

WIDTH CODE

| x0 | x1 | x2 | x3 | x4 |
|---|---|---|---|---|
| 4 | 0 | 4 | 0 | 4 |
| 0 | 0 | 0 | 0 | 0 |
| 0 | 4 | 0 | 4 | 0 |

FIG.24B

IMAGE PATTERN

|  | x0 | x1 | x2 | x3 | x4 |
|---|---|---|---|---|---|
| y0 | ■ |  | ■ |  | ■ |
| y1 |  |  |  |  |  |
| y2 | ■ |  | ■ |  | ■ |

WIDTH CODE

| x0 | x1 | x2 | x3 | x4 |
|---|---|---|---|---|
| 1 | 1 | 1 | 1 | 1 |
| 1 | 1 | 1 | 1 | 1 |
| 1 | 1 | 1 | 1 | 1 |

FIG.25A

IMAGE PATTERN

|  | x0 | x1 | x2 | x3 | x4 |
|---|---|---|---|---|---|
| y0 | ■ |  | ■ |  | ■ |
| y1 | ▪ |  | ▪ |  | ▪ |
| y2 |  | ■ |  | ■ |  |

WIDTH CODE

| x0 | x1 | x2 | x3 | x4 |
|---|---|---|---|---|
| 4 | 0 | 4 | 0 | 4 |
| 2 | 0 | 2 | 0 | 2 |
| 0 | 4 | 0 | 4 | 0 |

FIG.25B

IMAGE PATTERN

| x0 | x1 | x2 | x3 | x4 |
|---|---|---|---|---|

WIDTH CODE

| x0 | x1 | x2 | x3 | x4 |
|---|---|---|---|---|
| 5 | 0 | 5 | 0 | 5 |
| 0 | 1 | 0 | 1 | 0 |
| 0 | 5 | 0 | 5 | 0 |

FIG.25C

IMAGE PATTERN

| x0 | x1 | x2 | x3 | x4 |
|---|---|---|---|---|

WIDTH CODE

| x0 | x1 | x2 | x3 | x4 |
|---|---|---|---|---|
| 3 | 1 | 3 | 1 | 3 |
| 1 | 1 | 1 | 1 | 1 |
| 1 | 3 | 1 | 3 | 1 |

FIG.26A

IMAGE PATTERN

WIDTH CODE

| | x0 | x1 | x2 | x3 | x4 |
|---|---|---|---|---|---|
| y0 | 7 | 0 | 7 | 0 | 7 |
| y1 | 2 | 1 | 2 | 1 | 2 |
| y2 | 0 | 7 | 0 | 7 | 0 |

FIG.26B

IMAGE PATTERN

WIDTH CODE

| | x0 | x1 | x2 | x3 | x4 |
|---|---|---|---|---|---|
| y0 | 4 | 0 | 4 | 0 | 4 |
| y1 | 6 | 0 | 6 | 0 | 6 |
| y2 | 0 | 4 | 0 | 4 | 0 |

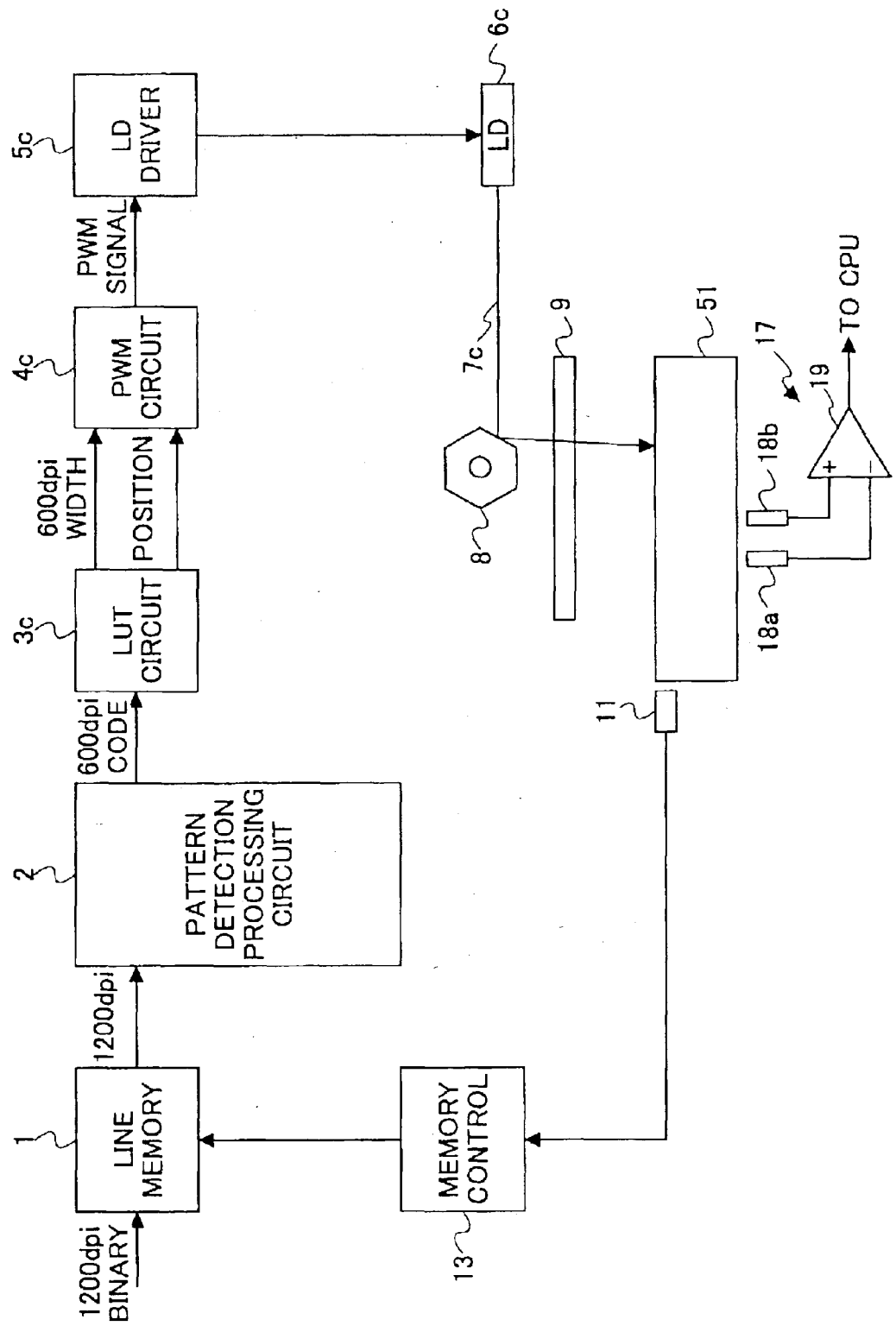

IMAGE FORMING APPARATUS HAVING AN EXPOSURE DEVICE CHANGING PULSE WIDTH OF A LIGHT BEAM BASED ON PATTERN DATA OF AN IMAGE

BACKGROUND OF THE INVENTION

1. Field of the Invention

The present invention generally relates to image forming apparatuses and, more particularly, to an image forming apparatus such as a digital copy machine or a laser printer, which forms a visible image using an electrophotography process.

2. Description of the Related Art

In an image forming apparatus of a electrophotograph system using a so-called negative/positive process system which forms a toner image by attaching a toner onto a part of a photosensitive member irradiated by a laser beam, a so-called overlap scanning method is known as a method for doubling a pixel density in a sub-scanning direction in which a surface of a recording medium is scanned by a light beam having a beam diameter larger than a sub-scanning pitch so as to form an image in a position where a plurality of beams overlap with each other.

For example, the integrated circuit (IC), designated as PM-2060i, manufactured by Oak Technology in the United States, has a function to convert an input of binary image data of 1200 dpi into a multi-value PWM output of a write cycle of 600 dpi, and capable of outputting a print corresponding to 1200 dpi without optically or mechanically changing a 600 dpi print engine.

Moreover, a so-called multi-beam scanning system which carries out an exposure scan of a surface of a photo conductor by a plurality of light beams simultaneously is widely used for the purpose of improvement in record density or improvement in recording speed.

A description will be given, with reference to FIG. 1, of an example of operation of the write-in signal processing part of an exposure device in an image forming apparatus using a multi-beam scanning system. A description will be given below of a case in which an image having 1200 dpi record density in both the main scanning direction and sub scanning direction by using an image forming apparatus of 600 dpi record density in both the main scanning direction and the sub scanning direction.

In FIG. 1, a line memory 101 stores 1200 dpi image data corresponding three lines, and sends the image data corresponding to a recording position in a main scanning direction.

The pattern detection processing circuit 102 sends a code corresponding to a matrix pattern to a look-up table (LUT) circuit 103 with reference to ON-OFF information of a total of six dots consisting of two consecutive dots to be currently recorded in the main scanning direction and four dots positioned above and below the two consecutive dots. The 2×3 dot matrix, two in the main scanning direction and three in the sub scanning direction, is referred to as a pattern detection matrix.

The LUT circuit 103 sends predetermined pulse width signal and pulse position signal to a pulse width modulation (PWM) circuit 104 in response to the code sent from the pattern detection processing circuit 102.

The PWM circuit 104 sends a PWM signal to a laser diode (LD) driver 105 based on the received pulse width signal and pulse position signal. The PWM signal is output in synchronization with a video clock signal (frequency of 600 dpi).

The LD driver 105 supplies to a laser diode (LD) 106 a drive current upon receipt of an "ON" signal and an offset current upon receipt of an "OFF" signal.

In the above-mentioned structure, the LD 106 emits a light beam so as to perform exposure scan on the surface of the photoconductor drum (not shown) by the light beam. The pitch of the exposure scan in the sub scanning direction is smaller than a beam diameter, which is defined by a value at which an intensity of light is $1/e^2$ of an intensity of light at the center of the beam. An image formation can be performed with a smaller pitch than the pitch of the exposure scan in the sub scanning direction by forming an electrostatic latent image also at a position on the photoconductor drum where adjacent light beams overlap with each other.

For example, it is supposed that the image data and the pattern detection matrix are as shown in FIG. 2. In the figure, x0, x1, ... and y0, y1, ... indicate scan positions at 600 dpi in the main scanning direction and the sub scanning direction, respectively. The PWM circuit 104 outputs the PWM signal at the same position in the main scanning direction over two lines, and outputs the PWM signal of the set-up pulse width. Thus, an image is formed in an area where areas irradiated by the light beams overlaps with each other. In this way, the formation of 1200 dpi image can be achieved by using the image forming apparatus of 600 dpi record density without changing a video clock frequency or a feed speed in the sub scanning direction.

As mentioned above, it is necessary to set the pulse width and the pulse position corresponding to the code sent from the pattern detection processing circuit 102 to the LUT circuit 103. The important matter at the time of setting up the pulse width is the following three points.

(1) When a solid black image is output, a maximum pulse width must be set so that a solid black portion has a proper concentration.

(2) When a plurality of single dot width horizontal lines offset by 1200 dpi to each other are output, a pulse width with respect to a corresponding code must be set so that a horizontal line formed in the scan position of the light beam and a horizontal line formed between two scan positions are in the same concentration.

(3) When a gray scale, which consists of a halftone pattern in which ON pixel density varies continuously, is output, a pulse width corresponding to each code must be set so that the variation in the concentration in the gray scale is continuous.

However, when an image is output using a look-up table prepared in consideration of the above-mentioned points, the following problems may occur.

For example, when image data consisting of a set of halftone patters as shown in FIGS. 3A and 3B are output, there may be a case in which the output images differ in concentration from each other although the density of ON pixels is equal. This is because the code generated by the pattern detection processing circuit 102 are different from each other between the two patterns since positions of the halftone patterns in the main scanning direction are offset from each other by a single dot of 1200 dpi.

In Japanese Patent Application No. 2002-27110 filed by the present applicant, the above-mentioned problems are solved by outputting a plurality of test patterns having the same ON pixel density but different relative positions with respect to the pattern detection matrix and setting a pulse width corresponding to each code in all levels so as to equalize the concentrations of the test patterns. However, it is not efficient to set the pulse width by a comparison of concentration for all codes generated by the pattern detection processing circuit 102.

In order to solve the above-mentioned problem, Japanese Patent Application No. 2001-107475 filed by the present applicants suggests a simplified procedure for setting the pulse width. With respect to three levels from among the levels to be set up, a plurality of test patterns having the same ON pixel density but having different positions with respect to the pattern detection matrix are output so as to set the pulse width corresponding to each code so that concentrations of the test patterns are equalized to each other. The remaining levels are determined by interpolation using the values of the levels that has already been set.

However, when a look-up table is prepared according to the above-mentioned method, fault may occur in an output image. For example, when a look-up table was prepared according to the above-mentioned characteristic and test pattern images are output by an image forming apparatus having a certain characteristic of exposure amount versus output image concentration, concentrations of the test pattern images, which have the same ON pixel density but different relative positions with respect to the pattern detection matrix, were equal to each other. However, when a look-up table was prepared according to the above-mentioned characteristic and test pattern images are output by an image forming apparatus having a different characteristic of exposure amount versus output image concentration, concentrations of the test pattern images, which have the same ON pixel density but different relative positions with respect to the pattern detection matrix, were different from each other. This is because pulse width determined by interpolation using the values of levels that have been determined were not appropriate.

In order to solve this problem, Japanese Patent Application No. 2001-183589 filed by the present applicants suggests that a setting is made so that concentrations of test patterns formed have the same ON pixel density. In the technique disclosed in this patent application, a plurality of test patterns are output with respect to at least three levels from among levels to be setup, the test patters being image patterns having the same ON pixel density but having different relative positions with respect to pattern detection matrix so as to set the concentrations of the thus-formed test patterns having the same ON pixel density to be equal to each other. With respect to the pulse width of remaining levels, a temporary value is determined by interpolation based on the values of the pulse widths corresponding to at least three levels that have been already set so as to output a plurality of test patterns having the same ON pixel density but having different relative positions with respect to the pattern detection matrix.

SUMMARY OF THE INVENTION

It is a general object of the present invention to provide an improved and useful image forming apparatus in which the above-mentioned problems are eliminated.

A more specific object of the present invention is to provide an image forming apparatus using a multi-scan system, which is capable of forming an image at a high speed.

It is another object of the present invention to prevent variation in concentration due to variation in a code over an entire image formed by the image forming apparatus.

It is a further object of the present invention to provide an image forming apparatus which can automatically select and set pulse width data to prevent variation in concentration due to variation in a code.

It is yet another object of the present invention is to make the image forming apparatus to perform an automatic selection process quickly.

It is still another object of the present invention to set the image forming apparatus to select appropriate pulse width data in response to changes in the image forming apparatus with respect to passage of time.

It is another object of the present invention to provide an image forming apparatus which can efficiently set a pulse width corresponding to a code generated by a pattern detection processing circuit so that concentrations of image outputs formed of a set of the same halftone patterns even when the code generated by the pattern detection processing circuit are different from each other depending on a relationship between an image pattern and a pattern detection matrix.

In order to achieve the above-mentioned objects, there is provided according to one aspect of the present invention an image forming apparatus comprising: a photo conductor; and an exposure device scanning a surface of the photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other, wherein the exposure device comprises: pattern detection processing means for producing a code of a plurality of levels from image data used for performing the latent image formation in accordance with a pattern detection matrix; pulse width setting means for setting a pulse with output from the pattern detection processing means with reference to pulse width data which designates a pulse width of each light beam previously set in response to the code of the plurality of levels; and a driver which drives each of the light-emitting element with the pulse width set by the pulse width setting means.

According to the above-mentioned invention, an overlap-scanning method is performed by simultaneously forming an electrostatic latent image by a plurality of light beams emitted by the plurality of light-emitting elements, and, thus, a high-speed image forming operation can be achieved as compared to an image forming operation using a single light beam.

In the image forming apparatus according to the present invention, the pulse width data referred to by the pulse with setting means may be set so that concentrations of image patters formed by a plurality of sets of a plurality of image patterns having different relative positions with respect to the pattern detection matrix are equal to each other.

Accordingly, generation of difference in concentration due to variation of code can be prevented over an entire formed image.

The image forming apparatus according to the present invention may further comprise: toner concentration sensors which detect a toner concentration of each of the image patters formed on the photo conductor; pulse width data selecting means for selecting a value of the pulse width data by forming the image pattern for each of sets of the plurality of image patterns having relative positions with respect to the pattern detection matrix and detecting the toner concentration of the image patterns formed on the photo conductor by the toner concentration sensors so that the detected toner concentrations are equal to each other with respect to the plurality of image patterns in each set of the image patterns; and data setting means for setting the selected pulse width data as the pulse width data referred to by the pulse width setting means.

Accordingly, the image forming apparatus can automatically select and set the pulse width data which can prevent the generation of difference in concentration due to variation in the code.

In the above-mentioned image forming apparatus the pulse width data selecting means may select the value of the pulse width data by forming the image patters having the same ON pixel density but different relative positions with respect to the pattern detection matrix with respect to at least three levels of the code so that the formed image patters of the same pixel density are equal to each other; and with respect to the pulse width data corresponding to the remaining levels, the pulse width data selecting means may select the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

Accordingly, the image forming apparatus can automatically select and set the pulse width data which can prevent the generation of difference in concentration due to variation in the code.

In the image forming apparatus according to the present invention, the number of the toner concentration sensors may be two, and the image forming apparatus may further comprise a comparator which compares concentration values output by the two toner concentration sensors.

Accordingly, two sets of image patterns can be simultaneously formed and the toner concentration can be simultaneously detected in the process of selecting the pulse width data, which results in a quick process.

The image forming apparatus according to the present invention may further comprise pulse data width updating means for performing the selection of the value of the pulse width data by the pulse width data selecting means and the setting of the pulse width data by the data setting means at a predetermined timing.

Accordingly, appropriate pulse width data can be selected and used in response to variation or degradation in the image forming apparatus with respect to passage of time.

The above-mentioned image forming apparatus may further comprise main power supply detecting means for detecting a main power supply of the image forming apparatus, and wherein the pulse data width updating means may perform the selection of the value of the pulse width data by the pulse width data selecting means and the setting of the pulse width data by the data setting means at a time when the main power supply is detected.

Accordingly, appropriate pulse width data can be selected and used in response to variation or degradation in the image forming apparatus with respect to passage of time.

In the image forming apparatus according to the present invention, the number of the light emitting elements provided in the exposure device may be two.

Accordingly, an image forming operation can be performed at a speed as high as twice that in a case where an electrostatic latent image is formed by a single light beam.

The image forming apparatus according to the present invention may further comprise an image reading device which reads an image of an original document, and outputs the image data used for forming the electrostatic latent images.

Accordingly, a high-speed image forming operation can be achieved after the image of the original document is read.

Additionally, there is provided according to another aspect of the present invention an image processing circuit comprising: a pattern detection processing circuit producing a code of a plurality of levels from image data according to a pattern detection matrix; a pulse width setting circuit setting a pulse with output from the pattern detection processing circuit with reference to pulse width data which designates a pulse width of each of light beams emitted by a plurality of light-emitting elements previously set in response to the code of the plurality of levels; and an exposure device which perform exposure scan on a photo conductor by the light beams emitted by the plurality of light-emitting elements so as to perform an image forming operation according to an electrophotograph method, wherein a plurality of electrostatic latent images are simultaneously performed at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof; and the pulse width is set with respect to the plurality of light-emitting elements performing the exposure scan; and the electrostatic latent image is formed also at a position where the plurality of light beams overlaps with each other so as to form the image with a pitch smaller than a pitch of the exposure scan in a sub scanning direction.

According to the above-mentioned invention, an overlap-scanning method is performed by simultaneously forming an electrostatic latent image by a plurality of light beams emitted by the plurality of light-emitting elements, and, thus, a high-speed image forming operation can be achieved as compared to an image forming operation using a single light beam.

In the image processing circuit according to the present invention, the pulse width data referred to by the pulse with setting circuit may be set so that concentrations of image patters formed by a plurality of sets of a plurality of image patterns having different relative positions with respect to the pattern detection matrix are equal to each other.

Accordingly, generation of difference in concentration due to variation of code can be prevented over an entire formed image.

In the image processing circuit according to the present invention, the pulse width setting circuit may be capable of updating the pulse width data which is previously set.

Accordingly, the image forming apparatus can automatically select and set the pulse width data which can prevent the generation of difference in concentration due to variation in the code.

In the image processing circuit according to the present invention, a plurality of the pattern detection processing circuits and the pulse width setting circuits are provided in response to a number of the light-emitting elements.

Accordingly, a high-speed image forming operation can be achieved by using the pattern detection processing circuits and the pulse width setting circuits.

In the image processing circuit according to the present invention, a number of the pattern detection processing circuits may be two, and a number of the pulse width setting circuits may be two.

Accordingly, an image forming operation can be performed at a high speed by using two pattern detection processing circuits and the two pulse width setting circuits.

Additionally, there is provided according to another aspect of the present invention a processor readable program having a computer to control an image forming apparatus to perform an image forming process, the image forming apparatus comprising: an exposure device scanning a surface of a photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other; pattern detection processing means for producing a code of a plurality of levels from image data used for performing the latent image formation in accordance with a pattern detection matrix; pulse width setting means for setting a pulse with output from the pattern detection processing means with reference to pulse width data which designates a pulse width of each light beam previously set in response to the code of the plurality of levels; a driver which drives each of the light-emitting element with the pulse width set by the pulse width setting means; and toner concentration sensors which detect a toner concentration of each of the image patters formed on the photo conductor, the program having the computer to perform: a pulse width data selecting process for selecting a value of the pulse width data by forming the image pattern for each of sets of the plurality of image patterns having relative positions with respect to the pattern detection matrix and detecting the toner concentration of the image patterns formed on the photo conductor by the toner concentration sensors so that the detected toner concentrations are equal to each other with respect to the plurality of image patterns in each set of the image patterns; and a data setting process for setting the selected pulse width data as the pulse width data referred to by the pulse width setting means.

Accordingly, the image forming apparatus can automatically select and set the pulse width data which can prevent generation of difference in concentration due to variation in the code.

In the processor readable program according to the present invention, the pulse width data selecting process may select the value of the pulse width data by forming the image patters having the same ON pixel density but different relative positions with respect to the pattern detection matrix with respect to at least three levels of the code so that the formed image patters of the same pixel density are equal to each other; and with respect to the pulse width data corresponding to the remaining levels, the pulse width data selecting means may select the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

Accordingly, the image forming apparatus can automatically select and set the pulse width data which can prevent generation of difference in concentration due to variation in the code.

In the processor readable program according to the present invention, the pulse width data selecting process may perform the selection of the value of the pulse width data when a number of the light-emitting elements of the exposure device is two.

Accordingly, an image forming operation can be performed at a speed as high as twice that in a case where an electrostatic latent image is formed by a single light beam.

Additionally, there is provided according to another aspect of the present invention a processor readable medium storing a program having a computer to control an image forming apparatus to perform an image forming process, the image forming apparatus comprising: an exposure device scanning a surface of a photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other; pattern detection processing means for producing a code of a plurality of levels from image data used for performing the latent image formation in accordance with a pattern detection matrix; pulse width setting means for setting a pulse with output from the pattern detection processing means with reference to pulse width data which designates a pulse width of each light beam previously set in response to the code of the plurality of levels; a driver which drives each of the light-emitting element with the pulse width set by the pulse width setting means; and toner concentration sensors which detect a toner concentration of each of the image patters formed on the photo conductor, the program having the computer to perform: a pulse width data selecting process for selecting a value of the pulse width data by forming the image pattern for each of sets of the plurality of image patterns having relative positions with respect to the pattern detection matrix and detecting the toner concentration of the image patterns formed on the photo conductor by the toner concentration sensors so that the detected toner concentrations are equal to each other with respect to the plurality of image patterns in each set of the image patterns; and a data setting process for setting the selected pulse width data as the pulse width data referred to by the pulse width setting means.

Accordingly, the image forming apparatus can automatically select and set the pulse width data which can prevent generation of difference in concentration due to variation in the code.

In the processor readable medium according to the present invention, the pulse width data selecting process may select the value of the pulse width data by forming the image patters having the same ON pixel density but different relative positions with respect to the pattern detection matrix with respect to at least three levels of the code so that the formed image patters of the same pixel density are equal to each other; and with respect to the pulse width data corresponding to the remaining levels, the pulse width data selecting means may select the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

Accordingly, the image forming apparatus can automatically select and set the pulse width data which can prevent generation of difference in concentration due to variation in the code.

In the processor readable medium according to the present invention, the pulse width data selecting process may perform the selection of the value of the pulse width data when a number of the light-emitting elements of the exposure device is two.

Accordingly, an image forming operation can be performed at a speed as high as twice that in a case where an electrostatic latent image is formed by a single light beam.

Additionally, there is provided according to another aspect of the present invention a pulse width data selecting method to be applied to an image forming apparatus which performs an image forming process comprising: an exposure device scanning a surface of a photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other; pattern detection processing means for producing a code of a plurality of levels from image data used for performing the latent image formation in accordance with a pattern detection matrix; pulse width setting means for setting a pulse with output from the pattern detection processing means with reference to pulse width data which designates a pulse width of each light beam previously set in response to the code of the plurality of levels; a driver which drives each of the light-emitting element with the pulse width set by the pulse width setting means; and toner concentration sensors which detect a toner concentration of each of the image patters formed on the photo conductor, the pulse width data selecting means comprising the steps of: forming the image pattern on the photo conductor for each of sets of the plurality of image patterns having relative positions with respect to the pattern detection matrix; determining the toner concentration of the image patterns formed on the photo conductor; and selecting a value of the pulse width data so that the toner concentrations are equal to each other with respect to the plurality of image patterns in each set of the image patterns.

Accordingly, the pulse width data, which can prevent generation of difference in concentration due to variation in the code, can be produced.

In the pulse width data selecting method according to the present invention, the selecting step may select the value of the pulse width data by forming the image patters having the same ON pixel density but different relative positions with respect to the pattern detection matrix with respect to at least three levels of the code so that the formed image patters of the same pixel density are equal to each other; and with respect to the pulse width data corresponding to the remaining levels, the selecting step may select the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

Accordingly, the pulse width data, which can prevent generation of difference in concentration due to variation in the code, can be produced.

In the pulse width data selecting method according to the present invention, the forming step, the determining step and the selecting step may be performed when a number of the light-emitting elements of the exposure device is two.

Accordingly, an image forming operation can be performed at a speed as high as twice that in a case where an electrostatic latent image is formed by a single light beam.

Additionally, there is provided according to another aspect of the present invention an image forming apparatus forming an image on a recording medium by scanning a light beam at a sub scanning pitch smaller than a beam diameter of the light beam, the beam diameter being defined by a value of an intensity of the light beam at which an intensity level of the light beam is $1/e^2$ of an intensity level at a center thereof, the image forming apparatus comprising: code producing means for producing a code of a plurality of levels from image data of an image to be formed according to a detection matrix; image forming means for forming the image on the recording medium by scanning the recording medium by the light beam at a pitch smaller than the sub scanning pitch which is mechanically defined, the light beam having a pulse width being set to correspond to the code of the plurality of levels, wherein, with respect to at least three levels from among the levels to be set, the pulse width of the light beam output in response to the code of the plurality of levels is produced from image patterns having the same ON pixel density, and a plurality of test patterns having different relative position with respect to the detection matrix are formed so as to equalize concentrations of the test patterns having the same ON pixel density; and the pulse width corresponding to the remaining levels of the code are produced from image patterns of the same ON pixel density by determining a temporary value as an initial value by interpolation using values of the pulse width corresponding to the already determined levels, and a plurality of test patterns having different relative position with respect to the detection matrix are formed so as to equalize concentrations of the test patterns having the same ON pixel density.

According to the above-mentioned invention, there is no difference generated in the concentration due to variation in the code generated by a pattern detection processing circuit. Additionally, since the comparison of concentration is performed based on an initial value which is determined using by interpolation using level values which are already determined, a number of repetition of the concentration comparing operations is small, which gives an efficient operation.

The image forming apparatus according to the above-mentioned invention may further comprise a plurality of concentration detecting part which measure a reflectance of a surface of the recording medium, and wherein the test patterns having a different relative position with respect to the detection matrix are formed on the surface of the recording medium so as to measure concentrations of the plurality of test patterns by the concentration detecting parts.

Accordingly, the concentration of the test patterns are measured by the concentration detecting part as an amount of increase in the reflectance of the surface of the recording medium (photo conductor drum) which is caused by a toner adhering onto the photo conductor drum, thereby achieving an automatic operation of a procedure for producing a look-up table for determining the pulse with.

In the image forming apparatus according to the above-mentioned invention, the setting of the pulse width corresponding to the code of the plurality of levels is performed when a power supply of the image forming apparatus is turned on.

Accordingly, the setting of the look-up table can be preformed each time a main power of the image forming apparatus is turned on. Thus, there is no generation of a difference between an image formed at a sub scanning position and an image formed between two sub scanning positions, which difference is cause by a change in the characteristic of the photo conductive drum with respect to passage of time or an increase in an amount of light due to deterioration of a laser diode with respect passage of time.

Other objects, features and advantages of the present invention will become more apparent from the following detailed description when read in conjunction with the accompanying drawings.

BRIEF DESCRIPTION OF THE DRAWINGS

FIG. 5 is a block diagram of an exposure device and a photo conductor provided in the image forming apparatus shown in FIG. 4;

FIG. 6 is an illustration for showing examples of a code which is produced by a pattern detection processing circuit according to ON/OFF information of image data;

FIG. 7 is an illustration showing correspondence between values of the code and values of a pulse width;

FIG. 8 is an illustration showing an example of setting of a pulse start position;

FIGS. 10A through 10D are illustrations showing image patters of a horizontal line having 1-dot width;

FIGS. 11A through 11D are illustrations showing image patterns of a horizontal line having 2-dot width;

FIGS. 12A and 12B are illustrations showing image patterns consisting of horizontally consecutive 2 dots;

FIGS. 13A through 13E are illustrations showing image patterns consisting of L-shaped 3 dots;

FIGS. 14A through 14C are illustrations showing image patterns consisting of L-shaped 5 dots;

FIGS. 21A and 21B are illustrations showing image patterns of a vertical line having 2-dot width;

FIGS. 22A and 22B are illustrations showing image patters of a horizontal line having 1-dot width;

FIGS. 24A and 24B are illustrations showing image patterns consisting of horizontally consecutive 2 dots;

FIGS. 25A through 25C are illustrations showing image patterns consisting of L-shaped 3 dots;

FIGS. 26A and 26B are illustrations showing image patterns consisting of L-shaped 5 dots;

FIG. 31 is a block diagram of the exposure device shown in FIG. 20, which is further provided with a toner concentration sensor.

DETAILED DESCRIPTION OF THE PREFERRED EMBODIMENTS

A description will now be given of a first embodiment of the present invention.

Figure 4:
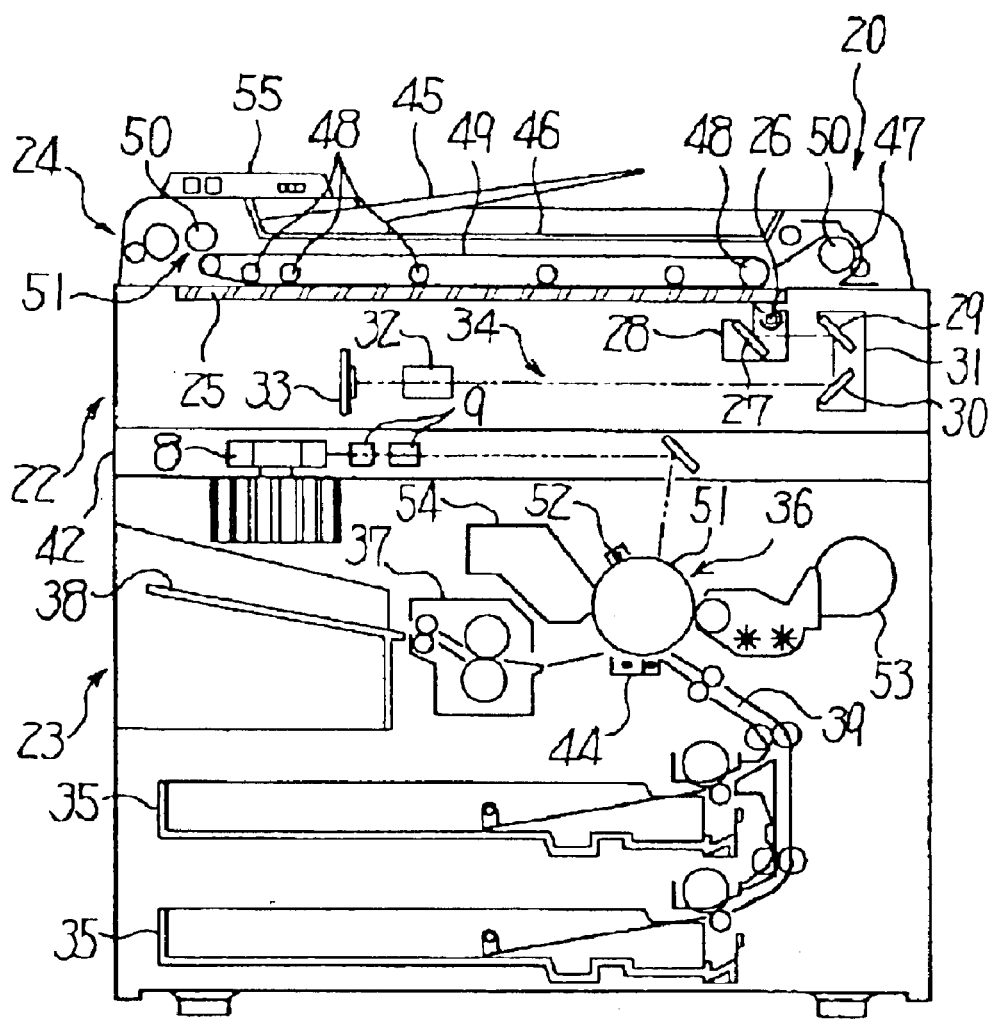
FIG. 4 is an illustration showing an entire structure of an image forming apparatus according to a first embodiment of the present invention.

FIG. 4 is an illustration of an entire image forming apparatus using an electrophotography system according to the first embodiment of the present invention. The image forming apparatus 20 shown in FIG. 4 comprises an image scanner 22 which is an image reading apparatus, a printer unit 23 which performs image formation on a print paper based on image data read by the image scanner 22, and an automatic document feeder (ADF) 24 which is provided on the image scanner 22.

Figure 1:
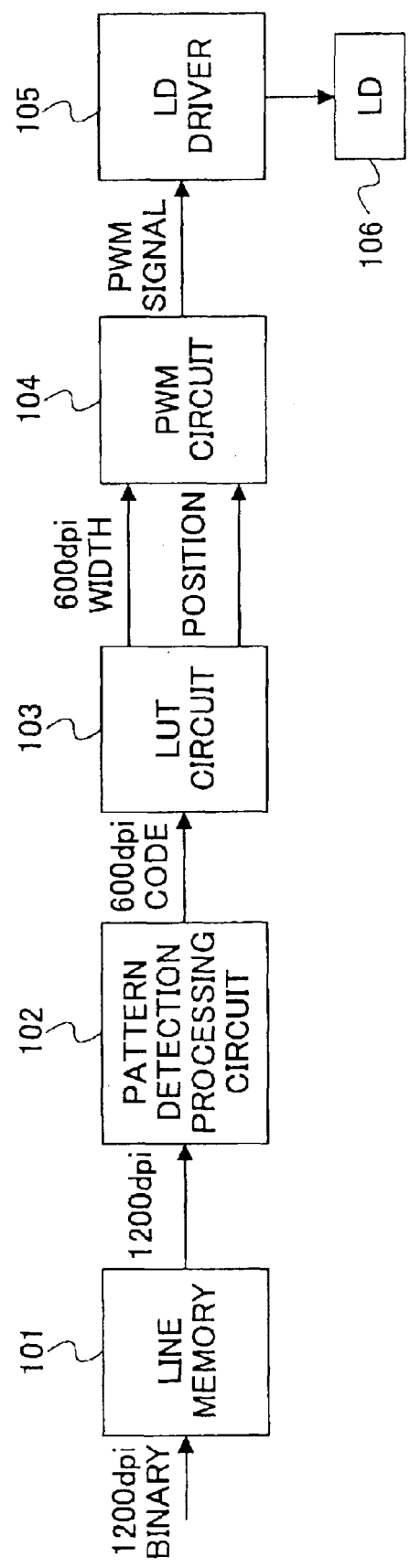
FIG. 1 is a block diagram of a write-in signal processing part of an exposure device provided in a conventional image forming apparatus.
Figure 2:
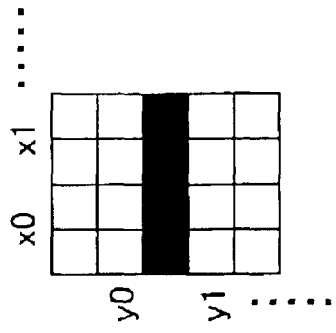
FIG. 2 is an illustration of an image represented by matrix pattern.
Figure 3A:
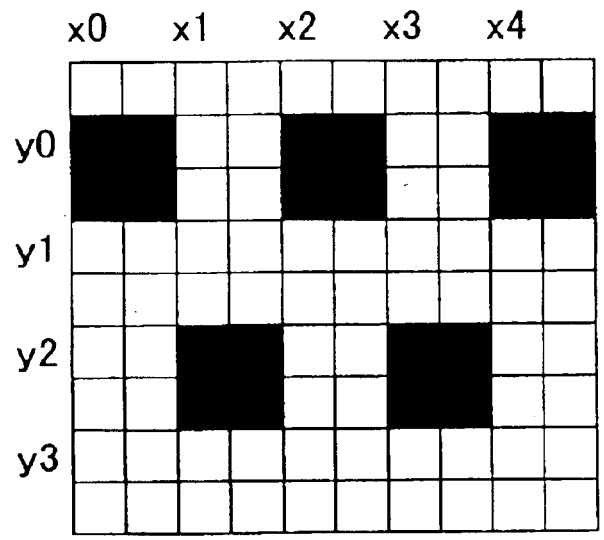
FIGS. 3A and 3B are illustrations showing image data generated by different sets of halftone patters.
Figure 3B:
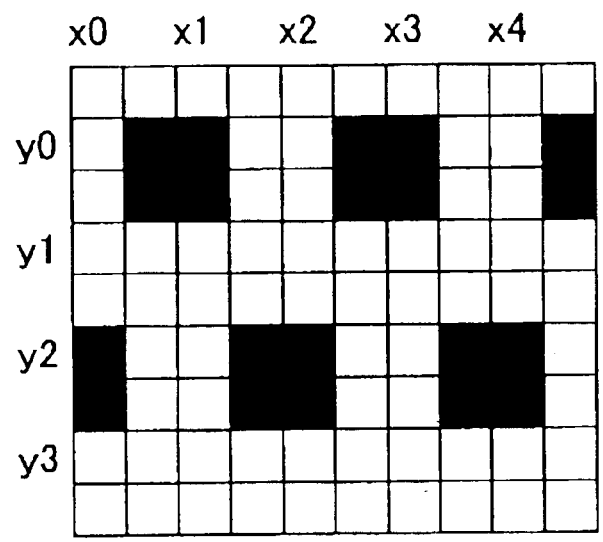

A contact glass 25 on which an original document to be read is placed is provided on the top surface of the image scanner 22. A scanning optical system 34 is provided under the contact glass 25. The scanning optical system 34 comprises a first carriage 18, a second carriage 31, an image forming lens 32 and a charge coupled device (CCD) 33 which is a photoelectric transfer element. The first carriage 18 comprises an illumination lamp 26 and a mirror 27, and is movable along the contact glass 25. The second carriage 31 comprises mirrors 29 and 30, and is movable along the contact glass 25. The first and second carriages 28 and 31 are driven by carriage motors (not shown) such as a stepping motor, and move from the home position (right-hand side) shown in FIG. 1 to left-hand side at a ratio of 2:1.

The printer unit 23 has a paper conveyance path 39 which is formed from a paper feed tray 35 in which print papers are accommodated in a stacked state to an ejected paper stacker 38 via a print engine 36, which performs image forming process on a print paper by en electrophotography method, and a fixing device 37. The pint engine 36 comprises a photo conductor 51, a charger device 52, an exposure device 42, a development device 53, a transfer device and a cleaning device 54. The charger device 52 charges a surface of the photo conductor 51. The exposure device 42 exposes the photo conductor 51 based on image data generated by the image scanner 22, and forms an electrostatic latent image. The development device 53 develops with a toner the electrostatic latent image formed on the surface of the photo conductor 51. The transfer device 44 transfers the toner image formed on the photo conductor 51 onto a print paper fed through the paper conveyance path 39. The cleaning device 54 cleans the surface of the photo conductor 51 after the toner image transfer.

The ADF 24 is provided with an original-document table 45 on which original documents fed to contact glass 25 by the ADF 24 are placed, and a paper eject unit 46 which ejects the original documents of which image reading is completed. An original-document conveyance path 47, which extends from the original-document table 45 to the paper eject unit 46, is formed within the ADF 24. A conveyance device of an endless belt 49 wound around a plurality of pairs of rollers 48 and a conveyance mechanism 51 including conveyance rollers 50, etc. are provided within the original-document conveyance path 47. The conveyance mechanism 51 is driven by an ADF motor (not shown) such as a stepping motor so as to convey the original documents placed on the original-document table 45 to the contact glass 25 on an individual sheet basis. The top surface of the ADF 24 is provided with a body console panel 55 having a keyboard and a display.

FIG. 5 is a block diagram of the exposure device 42 and the photo conductor 51 in the printer unit 23. It is supposed that an image is formed with 1200 dpi record density in both the main and sub scanning directions by using the printer unit which has 600 dpi recording density in both the main and sub scanning directions.

A line memory 1 stores image data corresponding to three lines, which image data is 1200 dpi binary image data obtained by the image scanner 22 and is subjected to predetermined signal processing and image processing, and outputs to a pattern detection processing circuit 2 the image data to be recorded, which corresponds to positions along the main scanning direction.

The pattern detection processing circuit 2 performs pattern detection processing. Specifically, the pattern detection processing circuit 2 refers to ON/OFF information regarding 6 dots which consists of 2 dots along the main scanning direction and 4 dots located above and under the two dots in the 1200 dpi image data, and outputs a code of 600 dpi corresponding to the ON/OFF information to look-up table (LUT) circuits 3a and 3b. The matrix formed by 2 dots in the main scanning direction×3 dots in the sub scanning direction is referred to as a pattern detection matrix.

Each of the LUT circuits 3a and 3b, which realize a pulse width setting means, outputs a pulse width signal and a pulse position signal, which are previously set, to pulse width modulation (PWM) circuits 4a and 4b, respectively, in accordance with the code sent from the pattern detection processing circuit 2.

Each of the PWM circuits 4a and 4b outputs a PWM signal to laser diode (LD) drivers 5a and 5b, respectively, based on the received pulse width signal and pulse position signal. The PWM signal is output in synchronization with a predetermined video clock signal (frequency of 600 dpi). The PWM circuits 4a and 4b is capable of outputting a pulse signal which sets a pulse width and a pulse start potion with a resolution of, for example, 1/256 of write-in period within a write-in period of 600 dpi.

Each of the LD drivers 5a and 5b, which realizes a driver, supplies to respective laser diodes (LDs) 6a and 6b, which are light-emitting elements, a drive current upon receipt of an "ON" signal and an offset current upon receipt of an "OFF" signal. The drive current is output with a pulse width and a pulse position which are specified by the pulse width signal and the pulse position signal. Thus, a so-called multi-light beam scanning system is realized which scans a surface of the photo conductor 51 simultaneously by two light beams 7a and 7b emitted from the LDs 6a and 6b. Although two light beams are used in this embodiment for the sake of convenience, three or more light beams may be used.

Namely, the exposure scan is performed on the photo conductor 51 by the light beams 7a and 7b emitted by the two LDs 6a and 6b so as to simultaneously form an electrostatic latent image at a plurality of positions on the surface of the photo conductor 51. The sub scanning pitch by the light beams 7a and 7b is smaller than the diameter of a beam defined by a value at which a light intensity becomes $1/e^2$ of a light intensity at the center of the light beam. Accordingly, by forming an image at the position where the light beams 7a and 7b overlaps with each other on the photo conductor 51, it becomes possible to form an image with a pitch smaller than the sub scanning pitch of the exposure scan.

The light beams 7a and 7b emitted by the LDs 6a and 6b are deflected by a polygon mirror 8 in the main scanning direction and reach the surface of the photo conductor 51 through a lens 9. The sub scanning pitch of each of the light beams from LDs 6a and 6b on the surface of the photo conductor 51 is 600 dpi. The synchronous detector 11 comprises a photoelectric transducer and a signal waveform shaping circuit so as to detect the light beams 7a and 7b of the LDs 6a and 6b and outputs a detection signal to the synchronous detection signal separation circuit 12. The synchronous detection signal separation circuit 12 separates the detection signal into synchronous detection signals for LDs 6a and 6b, and outputs the detection signals to a memory control circuit 13.

The memory control circuit 13 controls the output of image data from the line memory 1 to the pattern detection processing circuit 2 based on the synchronous detection signals. A central processing unit (CPU) 14 uses a random access memory (RAM) 16 as a work area and operates according to a program stored in a random access memory (ROM) 15, which is a memory medium, so as to control the operation of the entire circuits shown in FIG. 5.

FIG. 6 shows examples of the code which is produced by the pattern detection processing circuit 2 according to the ON/OFF information of image data. The examples of the width code c shown in FIG. 6 are output from the pattern detection processing circuit 2 to the LUT circuits 3a and 3b. That is, the width code c is a code for determining the aforementioned pulse width W. In FIG. 6, the vertical axis represents 3 dots arranged on the left side column of the pattern detection matrix in the sub scanning direction, and the horizontal axis represents 3 dots arranged on the right side column of the pattern detection matrix so as to indicate ON/OFF patterns of the left and right side columns. In each of the 3 dots on the vertical axis representing the left side column, a solid black portion indicates that the dot concerned is ON, and a blank white portion indicates that the dot concerned is OFF. The horizontal axis representing the right side column is the same as the vertical axis. The above-mentioned width code c can be determined according to the following equations (1) through (4) based on values of L and R, which appear at an intersection of an ON/OFF pattern of the left side column and an ON/OFF pattern of the right side column. For example, when all of 3 dots of the left side column and all of 3 dots of the right side column are ON, it can be appreciated from FIG. 6 that L=4 and R=4, and the value of the width code c is calculated as "8" according to the equation (1).

In equations (2) and (3), li and ri represent ON/OFF information of the image data corresponding to the left side column and the right side column off the pattern detection matrix, where ON is represented by 1 and OFF is represented by 0. The subscript i indicates a position within the pattern detection matrix in the vertical direction (sub scanning direction), the position being represented by 0, 1 and 2 from the top.

$$C = L + R \quad (1)$$

$$L = \sum_{i=0}^{2} L_i \cdot W_i \quad (2)$$

$$R = \sum_{i=0}^{2} r_i \cdot W_i \quad (3)$$

$$W0 = W2 = 1, \; W_l = 3 \quad (4)$$

The pulse width W corresponding to each value of the width code c is previously set in the LUTs 3a and 3b as table data. Additionally, the above-mentioned pulse start position S within a write-in period is determined by the following equation (5). In equation (5), P represents the maximum level value of the resolution within a write-in period (the value is 255 when the resolution is 1/256), and k is determined by the following equation (6).

$$S = \frac{P(1+k) - W}{2} \quad (5)$$

$$K = \frac{R - L}{\sum_{i=0}^{2} W_i} \quad (6)$$

If, for example, the pulse width W corresponding to each value of the width code c is set as shown in FIG. 7, the pulse start position S can be determined as shown in FIG. 8.

A description will now be given of a means for determining the pulse width W corresponding to each value of the width code c. With this means, an image of a predetermined image pattern (test pattern) is actually formed on the photo conductor 51 so as to determine the pulse width W corresponding to each value of the width code c. The examples of the image patterns are shown in FIGS. 9A through 14C. Each of FIGS. 9A through 14C shows an image pattern and the width code c corresponding to the image pattern. That is, the figures having the same number 9–14 together show a set of a plurality of image patterns, and the figures having the suffix A through D show image patterns corresponding to different relative positions with respect to the pattern detection matrix. That is, the image patterns of the same number of figure have the same density of ON pixels, but the width code c produced by the pattern detection processing circuit 2 is intentionally selected to be different from each other since the relative position with respect to the pattern detection matrix is different. The image patterns shown in FIGS. 9A–14C are parts of the image patterns, and the size of the image patterns actually output is, for example, about 20 pp×20 pp.

Figure 15:
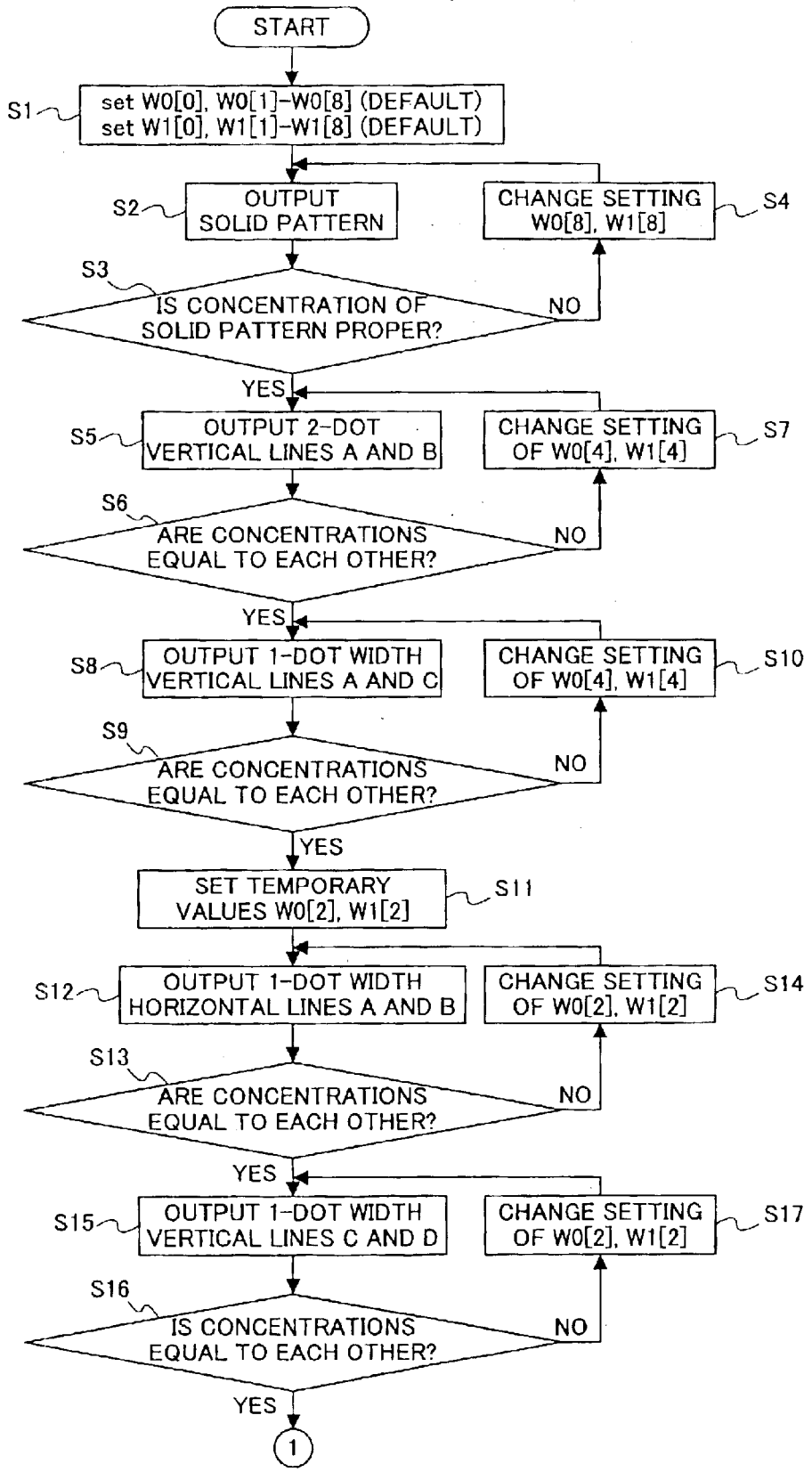
FIG. 15 is a part of a flowchart of an operation performed by the image forming apparatus according to the first embodiment of the present invention.
Figure 16:
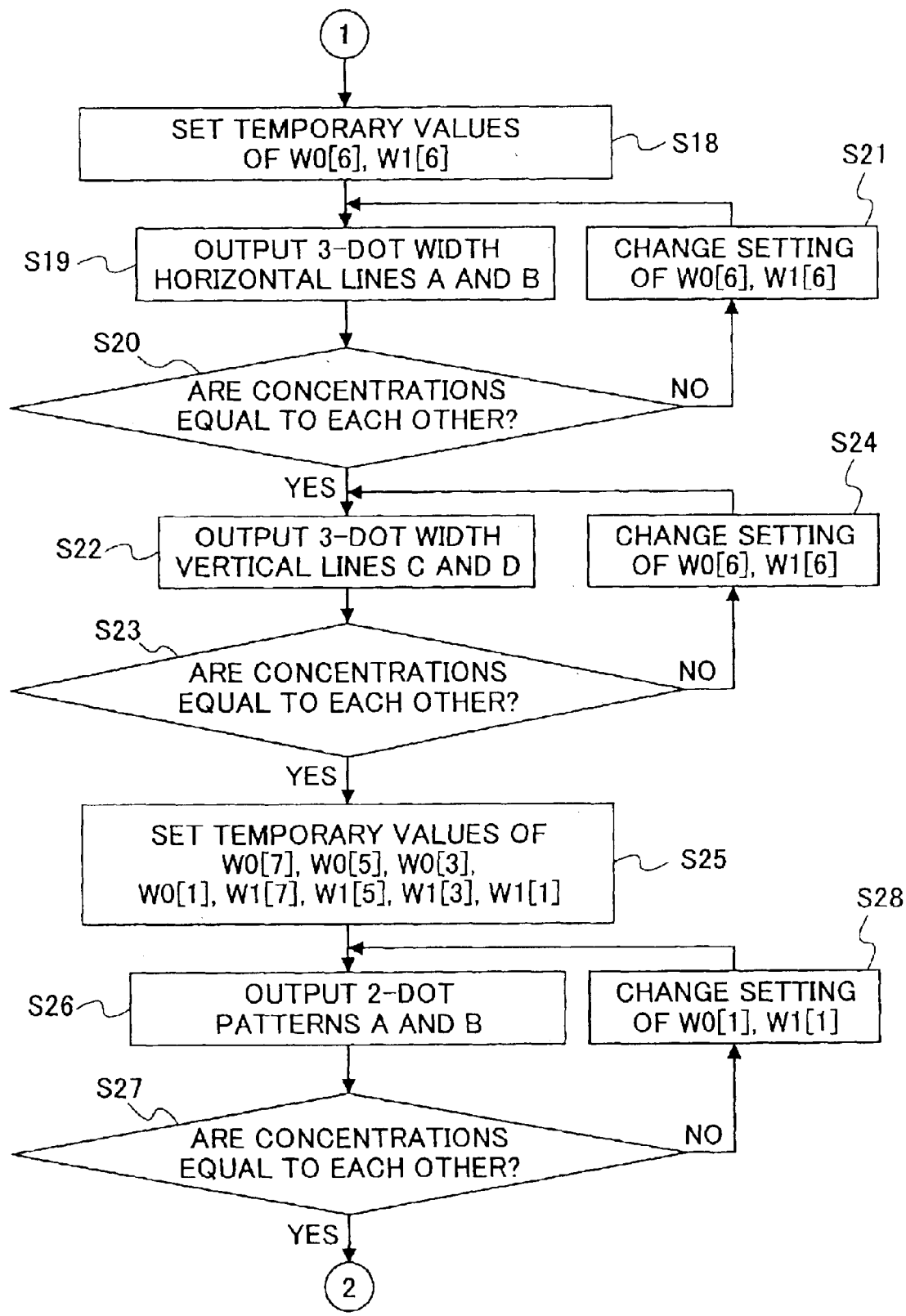
FIG. 16 is a part of a flowchart of an operation performed by the image forming apparatus according to the first embodiment of the present invention.
Figure 17:
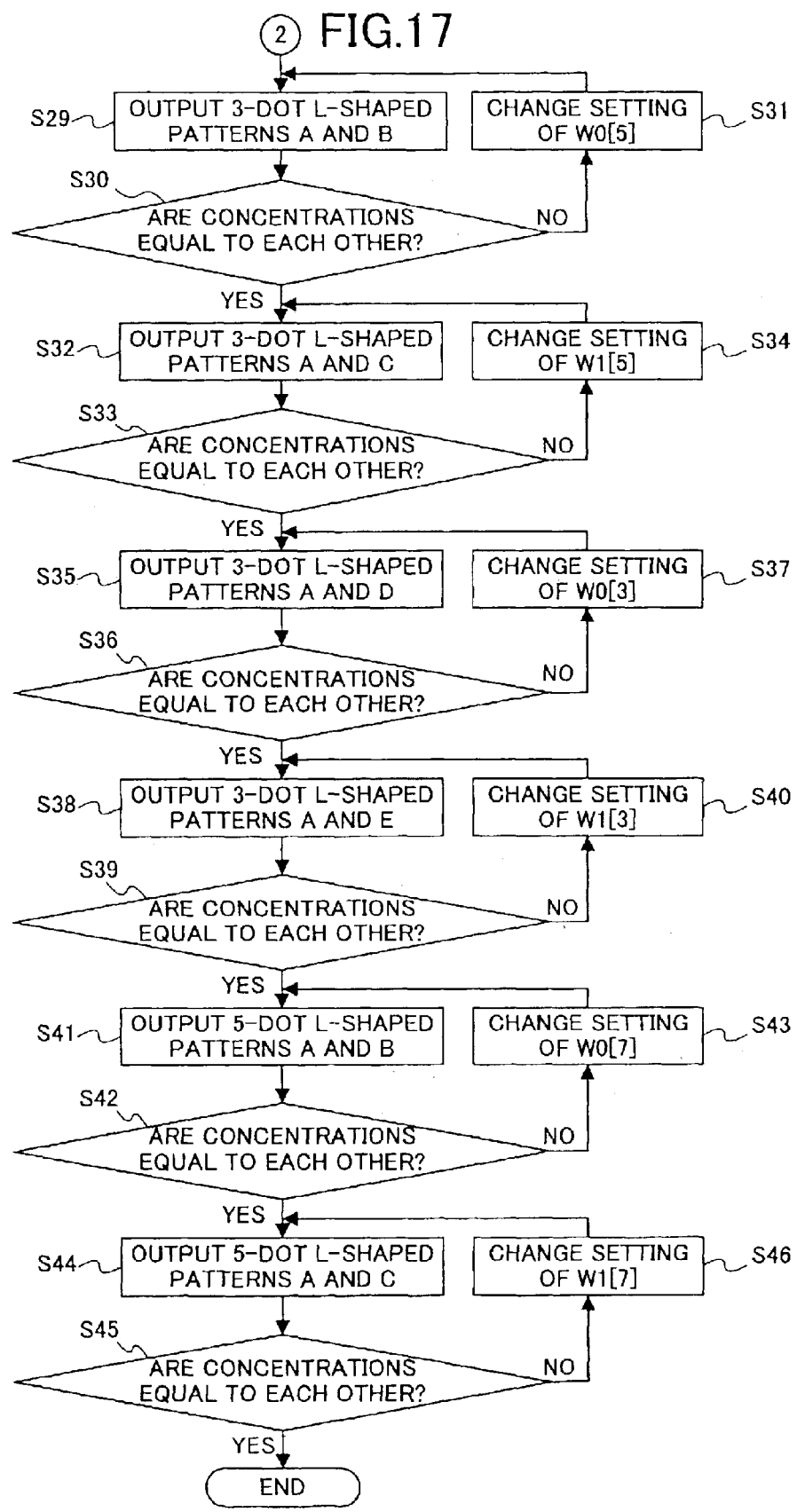
FIG. 17 is a part of a flowchart of an operation performed by the image forming apparatus according to the first embodiment of the present invention.
Figure 18:
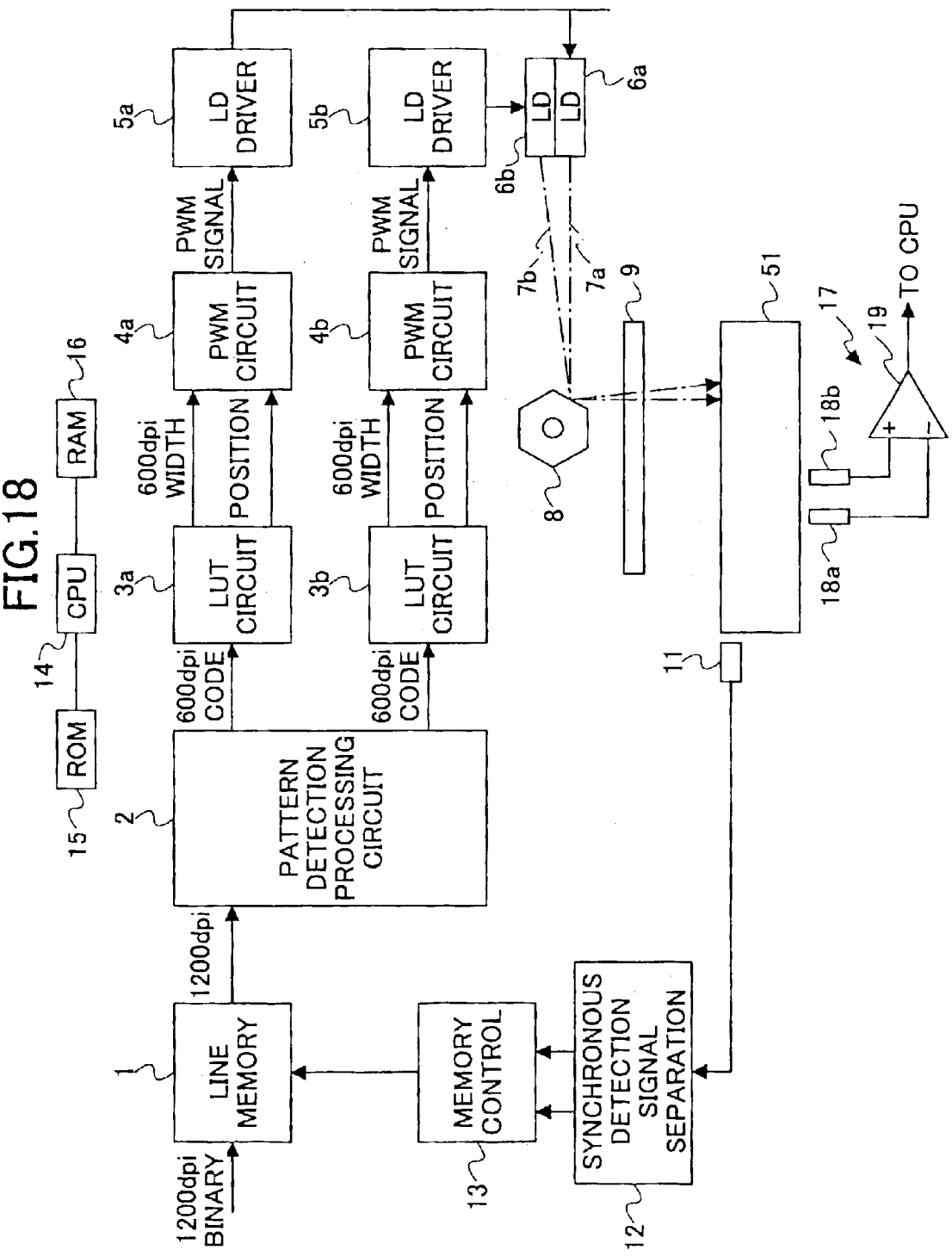
FIG. 18 is a block diagram of the exposure device and the photo conductor shown in FIG. 5, which is further provided with toner concentration sensors.

FIGS. 15 through 17 are parts of a flowchart of a procedure to determine the pulse width W. Although the process of FIGS. 15 through 17 can be performed in the manufacturing process of the image processing apparatus 20, the CPU 14 may automatically perform the process based on a predetermined program. The subscripts 0 and 1 attached to W in the figures correspond to LUT circuits 3a and 3b, respectively. W0[0] to W0[8] and W1[0] to W1[8] express pulse widths W corresponding to the width code c=0 to 8. Although the pulse width W0[0] and W1[0] corresponds to a case where all the pixels within the pattern detection matrix are OFF, the pulse width W0[0] and W1[0] are fixed as W0[0]=0 and W1[0]=0 since spot may be generated such as an unnecessary image drawn on the blank (white) portion when light pulses are output from the LDs 6a and 6b.

First, the pulse widths W0 and W1 are set in step S1 with respect to the LUT circuits 3a and 3b. The pulse widths W0[0] and W1[0] are set to 0 and W0[1]–W0[8] and W1[1]–W1[8] are set as default values. An image of a pattern of a solid black image is output in step S2, and it is determined, in step S3, whether or not toner concentration is proper for the solid black image.

Although the determination of step S3 is performed by visual check of an image formed on a transfer paper or the like when the process of FIGS. 15–17 is performed in the manufacturing process of the image forming apparatus 20, if the process is automatically performed by the control of the CPU 14, a concentration detection device 17 for detecting a toner on the photo conductor 51 is added to the structure shown in FIG. 5 so as to perform a process as follows.

That is, the concentration detection device 17 comprises two toner concentration sensors 18a and 18b, which are reflection-type light sensors, and a comparator 19. Each of the toner concentration sensors 18a and 18b measures toner concentrations of two image patterns formed at different positions on the photo conductor 51 according to detection of reflectance. The comparator 19 compares the detected values of the reflection-type light sensors 18a and 18b, and outputs the result of the comparison to the CPU 14.

Figure 9A:
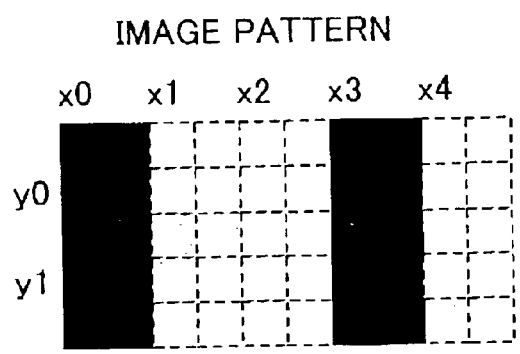
FIGS. 9A and 9B are illustrations showing image patterns of a vertical line having 2-dot width.
Figure 9B:
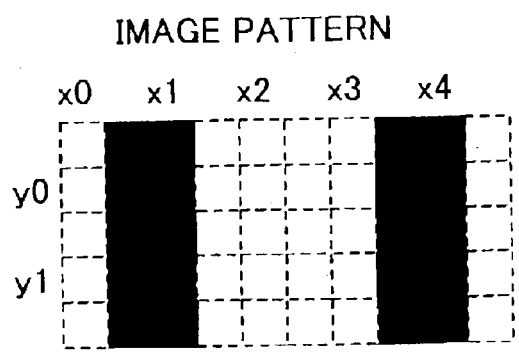

If it is determined, in step S3, that the measured concentration is not proper (N of step S3), the setting of the pulse widths W0[8] and W1[8] are changed in step S4, and the routine returns to step S2. If it is determined, in step S3, that the measured concentration is not proper (Y of step S3), vertical lines having a width of 2 dots shown in FIGS. 9A and 9B are output in step S5. Then it is determined, in step S6, whether or not the vertical lines of 2-dot width shown in FIGS. 9A and 9B have the same concentration. If it is determined that the concentrations are not the same (N of step S6), the setting of the pulse widths W0 [4] and W1[4] is changed in step S7, and the routine returns to step S5.

If it is determined that the concentrations of the vertical lines having 2-dot width shown in FIGS. 9A and 9B are the same (Y of step S6), vertical lines having a width of 1 dot are output in step S8. Then, it is determined, in step S9, whether or not the vertical lines of 1-dot width shown in FIGS. 10A and 10B have the same concentration. If it is determined that the concentrations are not the same (N of step S9), the setting of the pulse widths W0[2] and W1[2] is changed in step S10, and the routine returns to step S8.

If it is determined, in step S9, that the concentrations are the same (Y of step S9), a temporary value of W0[2] is set, in step S11, by a known interpolation method based on the previously set values of the pulse widths W0[8], W0[4] and W0[0]. Similarly a temporary value of W1[2] is set, in step S11, based on the values of the pulse widths of W1[8], W1[4] and W1[0].

Then, vertical lines having a width of 1 dot shown in FIGS. 10A and 10B are output in step S12. Thereafter, it is determined, in step S13, whether or not the concentrations of the output vertical lines of 2-dot width are the same. If it is determined that the concentrations are not the same (N of step S13), the setting of the pulse widths W0[2] and W1[2] is changed in step S14, and the routine returns to step S12.

If it is determined that the concentrations of the 1-dot width vertical lines of FIGS. 10A and 10B are the same (Y of step S13), vertical lines having a width of 1 dot shown in FIGS. 10C and 10D are output in step S15. Thereafter, it is determined, in step S16, whether or not the concentrations of the output vertical lines of 1-dot width are the same. If it is determined that the concentrations are not the same (N of step S16), the setting of the pulse widths W0[2] and W1[2] is changed in step S17, and the routine returns to step S15.

If it is determined, in step S16, that the concentrations are the same (Y of step S16), a temporary value of W0[6] is set, in step S18, by a known interpolation method based on the previously set values of the pulse widths W0[8], W0[4], W0[2] and W0[0]. Similarly a temporary value of W1[6] is set, in step S18, based on the values of the pulse widths of W1[8], W1[4], W1[2] and W1[0].

Then, vertical lines having a width of 3 dots shown in FIGS. 11A and 11B are output in step S19. Thereafter, it is determined, in step S20, whether or not the concentrations of the output vertical lines of 3-dot width are the same. If it is determined that the concentrations are not the same (N of step S20), the setting of the pulse widths W0[6] and W1[6] is changed in step S21, and the routine returns to step S19.

If it is determined that the concentrations of the 3-dot width vertical lines of FIGS. 11A and 11B are the same (Y of step S20), vertical lines having a width of 3 dot shown in FIGS. 11C and 11D are output in step S22. Thereafter, it is determined, in step S23, whether or not the concentrations of the output vertical lines of 3-dot width are the same. If it is determined that the concentrations are not the same (N of step S23), the setting of the pulse widths W0[6] and W1[6] is changed in step S24, and the routine returns to step S22.

If it is determined, in step S23, that the concentrations are the same (Y of step S23), temporary values of W0[7], W0[5], W0[3] and W0[1] are set, in step S25, by a known interpolation method based on the previously set values of the pulse widths W0[8], W0[6], W0[4], W0[2] and W0[0]. Similarly temporary values of W1[7], W1[5], W1[3] and W1[1] are set, in step S25, based on the values of the pulse widths of W1[8], W1[6], W1[4], W1[2] and W1[0].

Thereafter, halftone patterns of a length of 2 dots shown in FIGS. 12A and 12B are output in step S26. Then, it is determined, in step S27, whether or not the concentrations of the 2-dot length halftone pattern are the same. If it is determined that the concentrations are not the same (N of step S27), the setting of the pulse width W0[1] and W1[1] is changed in step S28, and the routine returns to step S26.

If it is determined, in step S27, that the concentrations are the same, halftone patterns having L-shaped 3 dots shown in FIGS. 13A and 13B are output in step S29. Then, it is determined, in step S30, whether or not the concentrations of the 3-dot L-shaped halftone patterns are the same. If it is determined that the concentrations are not the same (N of step S30), the setting of the pulse width W0[5] is changed in step S31, and the routine returns to step S29.

If it is determined, in step S30, that the concentrations are the same, halftone patterns having L-shaped 3 dots shown in FIGS. 13A and 13C are output in step S32. Then, it is determined, in step S33, whether or not the concentrations of the 3-dot L-shaped halftone patterns are the same. If it is determined that the concentrations are not the same (N of step S33), the setting of the pulse width W1[5] is changed in step S34, and the routine returns to step S32.

Figure 13D:
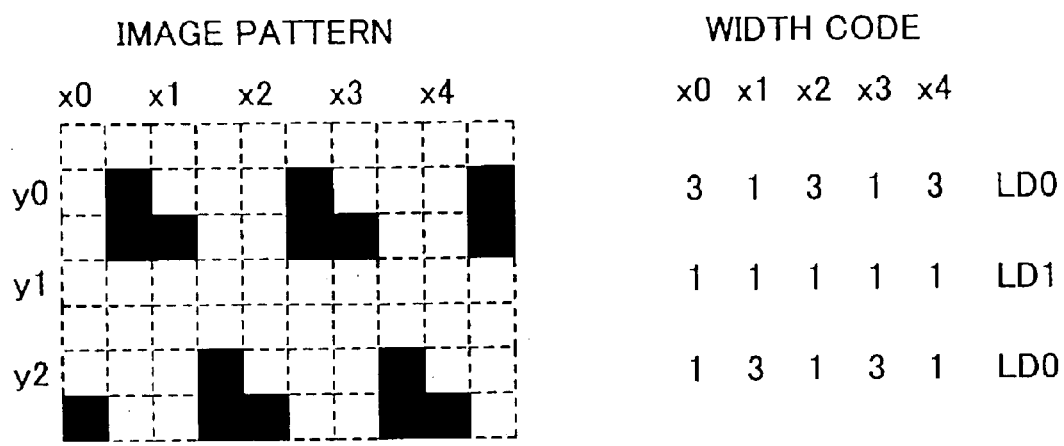

If it is determined, in step S33, that the concentrations are the same, halftone patterns having L-shaped 3 dots shown in FIGS. 13A and 13D are output in step S35. Then, it is determined, in step S36, whether or not the concentrations of the 3-dot L-shaped halftone patterns are the same. If it is determined that the concentrations are not the same (N of step S36), the setting of the pulse width W0[3] is changed in step S37, and the routine returns to step S35.

Figure 13E:
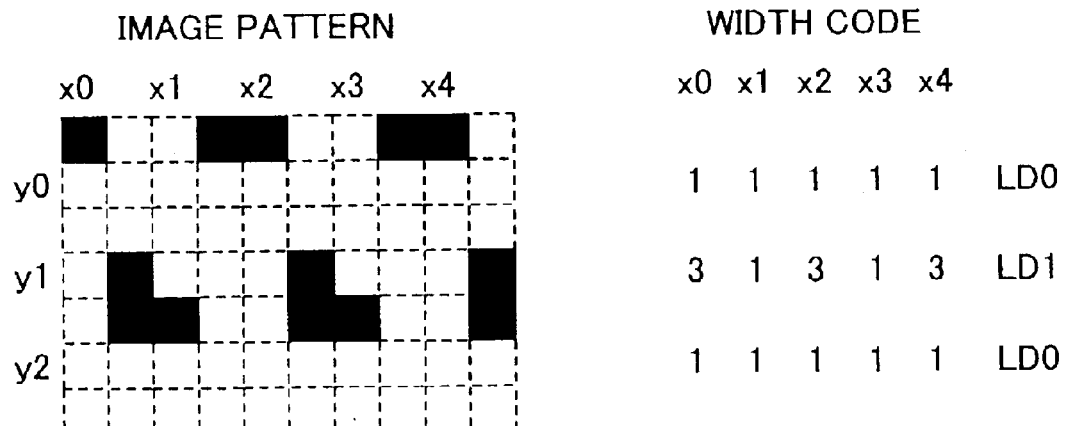

If it is determined, in step S36, that the concentrations are the same, halftone patterns having L-shaped 3 dots shown in FIGS. 13A and 13E are output in step S38. Then, it is determined, in step S39, whether or not the concentrations of the 3-dot L-shaped halftone patterns are the same. If it is determined that the concentrations are not the same (N of step S39), the setting of the pulse width W1[3] is changed in step S40, and the routine returns to step S38.

If it is determined, in step S39, that the concentrations are the same, halftone patterns having L-shaped 5 dots shown in FIGS. 14A and 14B are output in step S41. Then, it is determined, in step S42, whether or not the concentrations of the 5-dot L-shaped halftone patterns are the same. If it is determined that the concentrations are not the same (N of step S42), the setting of the pulse width W0[7] is changed in step S43, and the routine returns to step S41

If it is determined, in step S42, that the concentrations are the same, halftone patterns having L-shaped 5 dots shown in FIGS. 14A and 41C are output in step S44. Then, it is determined, in step S45, whether or not the concentrations of the 5-dot L-shaped halftone patterns are the same. If it is determined that the concentrations are not the same (N of step S45), the setting of the pulse width W1[7] is changed in step S46, and the routine returns to step S44 and, thus, the series of operations are ended.

A pulse width data selection means and a pulse width data selection process are achieved by the CPU 14 performing the process of the flowchart shown in FIGS. 15 through 17 in accordance with a program stored in the ROM 15. Moreover, an image forming process, a determination process and a selection process are achieved by performing each process shown in FIGS. 15 through 17 in a manufacturing process of the image forming apparatus 20.

As mentioned above, the values of the pulse width shown in FIG. 7, which is used by the LUT circuits 3a and 3b, are obtained. Thus, the values are previously set as table data for the LUT circuits 3a and 3b in the manufacturing process, or when the process of FIGS. 15 through 17 is performed by the CPU 14, the CPU 14 sets the value as table data for the LUT circuits 3a and 3b. This setup achieves a data setting means and a data setting process.

Accordingly, an appropriate image concentration can be obtained by visually evaluating an image formed on a transfer material using the image forming apparatus 20 having the thus-set table data for the LUT circuits 3a and 3b, the image including all of the image patterns shown in FIGS. 9A through 14C and a gray scale having a halftone pattern in which the ON pixel density continuously varies.

That is, concentration of a solid black part becomes proper. Concentrations of the horizontal lines shown in FIGS. 10A through 10D having a 1-dot width become equal to each other. Change in concentration of the gray scale becomes continuous. Concentrations of the vertical lines having 2-dot width shown in FIGS. 9A and 9B become equal to each other. Concentrations of the horizontal lines having 3-dot width shown in FIGS. 11A through 11D become equal to each other. Concentrations of the halftone patterns having horizontally consecutive 2 dots shown in FIGS. 12A and 12B become equal to each other. Concentrations of the L-shaped halftone patterns having 3 dots shown in FIGS. 13A through 13E become equal to each other. Concentrations of the L-shaped halftone patterns having 5 dots shown in FIGS. 14A through 14C become equal to each other.

If the table data set in the LUT circuits 3a and 3b is not appropriate, a difference may be generated in concentration between images having the same halftone pattern but different relative positions with respect to the pattern detection matrix. However, according to the image forming apparatus 20 of the present embodiment, generation of such a difference in concentration can be prevented.

It should be noted that although the photo conductor 51 is concurrently exposed by two light beams emitted by the two LDs 6a and 6b in the present embodiment, in order to achieve further speed up, the number of the LDs may be three or more so as to concurrently expose by three or more light beams. In such a case, the table data can be set to each LUT circuit in the same manner as the case using the two light beams. However, the number of kinds of image patterns as the test patterns used for the comparison of toner concentration increases as the number of light beams increases.

For example, speaking of the horizontal line having 1-dot width, the number of patterns which must be drawn is twice the number of light beams as follows.

If only one light beam is used (that is, only LD 6a is used and LD 6b is not used):

(1) a pattern drawn by the light beam emitted by the LD 6a; and (2) a pattern superimposingly drawn by the light beam emitted by the LD 6a and the light beam emitted by the LD 6a in the subsequent scan.

If two light beams are used (that is, the LDs 6a and 6b are used as mentioned above):

(1) a pattern drawn by the light beam emitted by the LD 6a;

(2) a pattern superimposingly drawn by the light beam emitted by the LD 6a and the light beam emitted by the LD 6a in the subsequent scan;

(3) a pattern drawn by the light beam emitted by the LD 6b; and (4) a pattern superimposingly drawn by the light beam emitted by the LD 6b and the light beam emitted by the LD 6a in the subsequent scan.

If four light beams are used (that is, two additional LDs (supposing LDs 6c and 6d) are used in addition to LDs 6a and 6b):

(1) a pattern drawn by the light beam emitted by the LD 6a;

(2) a pattern superimposingly drawn by the light beam emitted by the LD 6a and the light beam emitted by the LD 6b (3) a pattern drawn by the light beam emitted by the LD 6b;

(4) a pattern superimposingly drawn by the light beam emitted by the LD 6b and the light beam emitted by the LD 6c;

(5) a pattern drawn by the light beam emitted by the LD 6c;

(6) a pattern superimposingly drawn by the light beam emitted by the LD 6c and the light beam emitted by the LD 6d (7) a pattern drawn by the light beam emitted by the LD 6d; and (8) a pattern superimposingly drawn by the light beam emitted by the LD 6d and the light beam emitted by the LD 6a in the subsequent scan.

As mentioned above, the number of kinds of image patterns as the test patterns used for the comparison of toner concentration increases as the number of light beams increases.

It should be noted that if the image forming apparatus 20 is continuously used for a long time after the table data of the pulse width is set in the LUT circuits 3a and 3b, the toner concentration of an image formed on a sub scanning position and the toner concentration of an image formed at a position between two sub scanning position may become different due to variation in the characteristic of the photo conductor 51 with respect to passage of time and an decrease in the light intensity of the LDs 6a and 6b with respect to passage of time.

Figure 19:
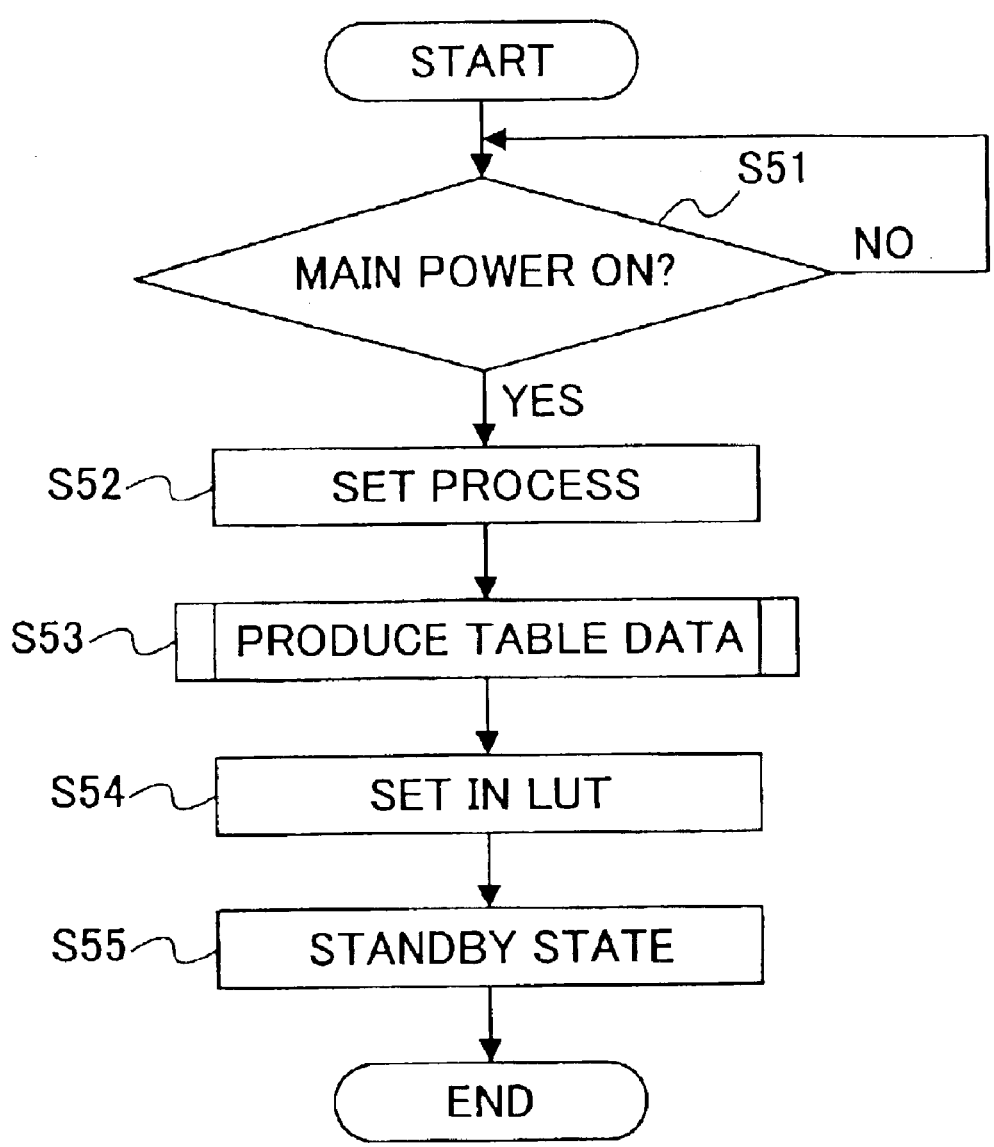
FIG. 19 is a flowchart of an operation for setting table data in look-up table circuits.

Accordingly, if the image forming apparatus 20 is provided with a function to produce the table data of the pulse width by performing the process described with reference to FIGS. 15 through 17, each time the main power source of the image formation apparatus 20 is turned on (Y of step S51), as shown in FIG. 19, the process of producing the table data of the pulse width W is performed in step S53 after performing predetermined process setting in step S52. The thus-produced table date is set in the LUT circuits 3a and 3b in step S54, and then the image forming apparatus 20 is set in a standby state in step 55. Accordingly, there is no difference generated in the toner concentration due to variation with respect to passage of time. If the computed table data are set in the LUT circuits 3a and 3b in step S54 and a standby state is set in step S55, the difference in the concentration of the toner image due to degradation with the passage of time is not be produced.

In the above-mentioned process, a main power supply detecting means is achieved by the process of step S51, and a pulse width data updating means is achieved by the process of steps S53 and S54.

According to the above-mentioned image forming 20, since an electrostatic latent image is formed simultaneously by two LDs 6a and 6b, a high-speed image formation can be achieved as compared to a case where an electrostatic latent image is formed by a single light beam.

Since the table data set in the LUT circuits 3a and 3b in this case is as mentioned above, generation of variation in concentration due to variation in the code c can be prevented over the thus-formed image in its entirety.

Moreover, when the process of FIGS. 15 through 17 is performed by the control of the CPU 14, the image forming apparatus 20 can automatically set the pulse width which can prevent variation in concentration due to variation in the code c.

Since the concentration detection apparatus 17 is provided with two toner concentration sensors 18a and 18b, 2 sets of image patterns can be formed simultaneously on the photo conductor 51 and the toner concentrations can be detected simultaneously, which results in a rapid process.

Since the process described with reference to FIG. 19 is performed, an appropriate pulse width W can be selected and used in response to variation in the image forming apparatus with respect to passage of time. In this case, the process of steps S53 and S54 may be performed not only a time the main power supply is turned on but also a predetermined time, for example, each time a predetermined number of images are formed.

A description will now be given of a second embodiment of the present invention.

Figure 20:
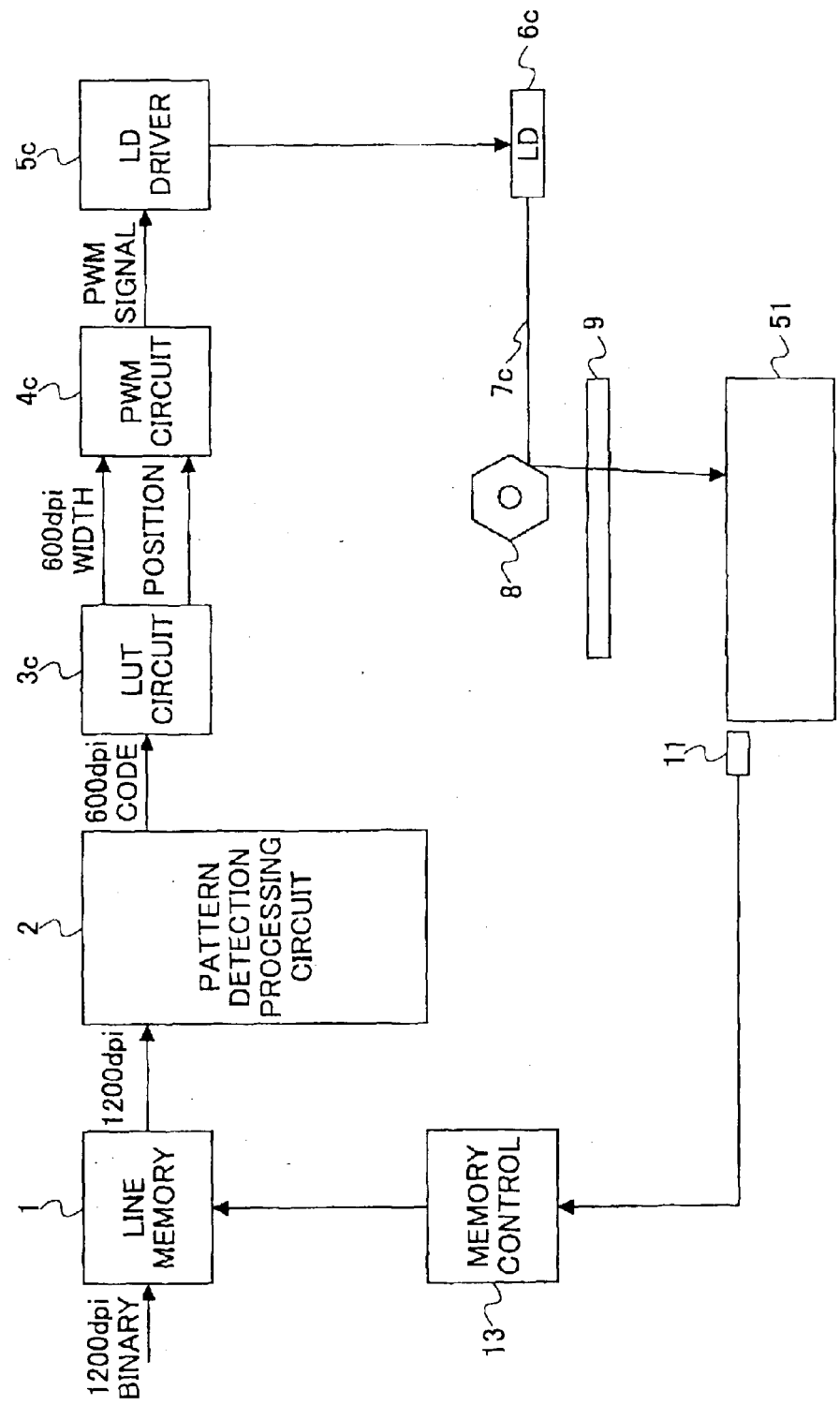
FIG. 20 is a block diagram of an exposure apparatus provided in an image forming apparatus according to a second embodiment of the present invention.

FIG. 20 is a block diagram of an exposure device provided in an image forming apparatus according to the second embodiment of the present invention. It should be noted that an entire structure of the image forming apparatus according to the second embodiment of the present invention is similar to the image forming apparatus shown in FIG. 4, and description thereof will be omitted.

The exposure device shown in FIG. 20 has the same structure as the exposure apparatus of the first embodiment shown in FIG. 5 except for the LUT circuits 3a and 3b, the PWM circuits 4a and 4b, the LD drivers 5a and 5b and the LDs 6a and 6b being replaced by an LUT circuit 3c, a PWM circuit 4c, an LD drivers 5c and an LD 6c, respectively. Additionally, the synchronization detection signal separation circuit 12 is not provided since only one laser diode 6c is used in the present embodiment.

Similar to the exposure device shown in FIG. 5, the line memory 1 stores image data corresponding to three lines, which image data is 1200 dpi binary image data obtained by the image scanner 22 and is subjected to predetermined signal processing and image processing, and outputs to a pattern detection processing circuit 2 the image data to be recorded, which corresponds to positions along the main scanning direction.

The pattern detection processing circuit 2 performs pattern detection processing. Specifically, the pattern detection processing circuit 2 refers to ON/OFF information regarding 6 dots which consists of 2 dots along the main scanning direction and 4 dots located above and under the two dots in the 1200 dpi image data, and outputs a code 600 dpi corresponding to the ON/OFF information to the look-up table (LUT) circuit 3c. The matrix formed by 2 dots in the main scanning direction×3 dots in the sub scanning direction is referred to as a pattern detection matrix. The LUT circuits 3c outputs a pulse width signal and a pulse position signal, which are previously set, to pulse width modulation (PWM) circuit 4c in accordance with the code sent from the pattern detection processing circuit 2.

The PWM circuit 4c outputs a PWM signal to the laser diode (LD) driver 5c based on the received pulse width signal and pulse position signal. The PWM signal is output in synchronization with a predetermined video clock signal (frequency of 600 dpi). The PWM circuit 4c is capable of outputting a pulse signal which sets a pulse width and a pulse start potion with a resolution of, for example, 1/256 of write-in period within a write-in period of 600 dpi.

The LD driver 5c supplies to the laser diode (LD) 6c, which is a light-emitting element, a drive current upon receipt of an "ON" signal and an offset current upon receipt of an "OFF" signal. The drive current is output with a pulse width and a pulse position which are specified by the pulse width signal and the pulse position signal. Thus, a surface of the photo conductor 51 is scanned by a light beam 7c emitted from the LD 6c. The light beam 7c emitted by the LD 6c is deflected by the polygon mirror 8 in the main scanning direction and reaches the surface of the photo conductor 51 through a lens 9. The sub scanning pitch of each of the light beam from LD 6c on the surface of the photo conductor 51 is 600 dpi. The synchronous detector 11 comprises a photoelectric transducer and a signal waveform shaping circuit so as to detect the light beam 7c of the LD 6c and outputs a detection signal to the memory control circuit 13. The memory control circuit 13 controls the output of image data from the line memory 1 to the pattern detection processing circuit 2 based on the synchronous detection signals.

The code which is produced by the pattern detection processing circuit 2 according to the ON/OFF information of image data is similar to that shown in FIG. 6. The width code c shown in FIG. 6 for example is output from the pattern detection processing circuit 2 to the LUT circuit 3c.

The pulse width W and the pulse start position S are determined in the same manner as that described in the first embodiment with reference to the equations (1) through (6), and descriptions thereof will be omitted.

FIGS. 21A through 26B are illustrations showing examples of test patterns formed by the image forming apparatus according to the present embodiment. Specifically, FIGS. 21A and 21B are illustrations showing image patterns of a vertical line having 2-dot width. FIGS. 22A and 22B are illustrations showing image patters of a horizontal line having 1-dot width. FIGS. 23A and 23B are illustrations showing image patterns of a horizontal line having 2-dot width. FIGS. 24A and 24B are illustrations showing image patterns consisting of horizontally consecutive 2 dots. FIGS. 25A through 25C are illustrations showing image patterns consisting of L-shaped 3 dots. FIGS. 26A and 26B are illustrations showing image patterns consisting of L-shaped 5 dots.

The image patterns of the same number of figure have the same density of ON pixels, but the width code c produced by the pattern detection processing circuit 2 is intentionally selected to be different from each other since the relative position with respect to the pattern detection matrix is different. The image patterns shown in FIGS. 21A through 26B are parts of the image patterns, and the size of the image patterns actually output is, for example, about 20 mm×20 mm.

Figure 27:
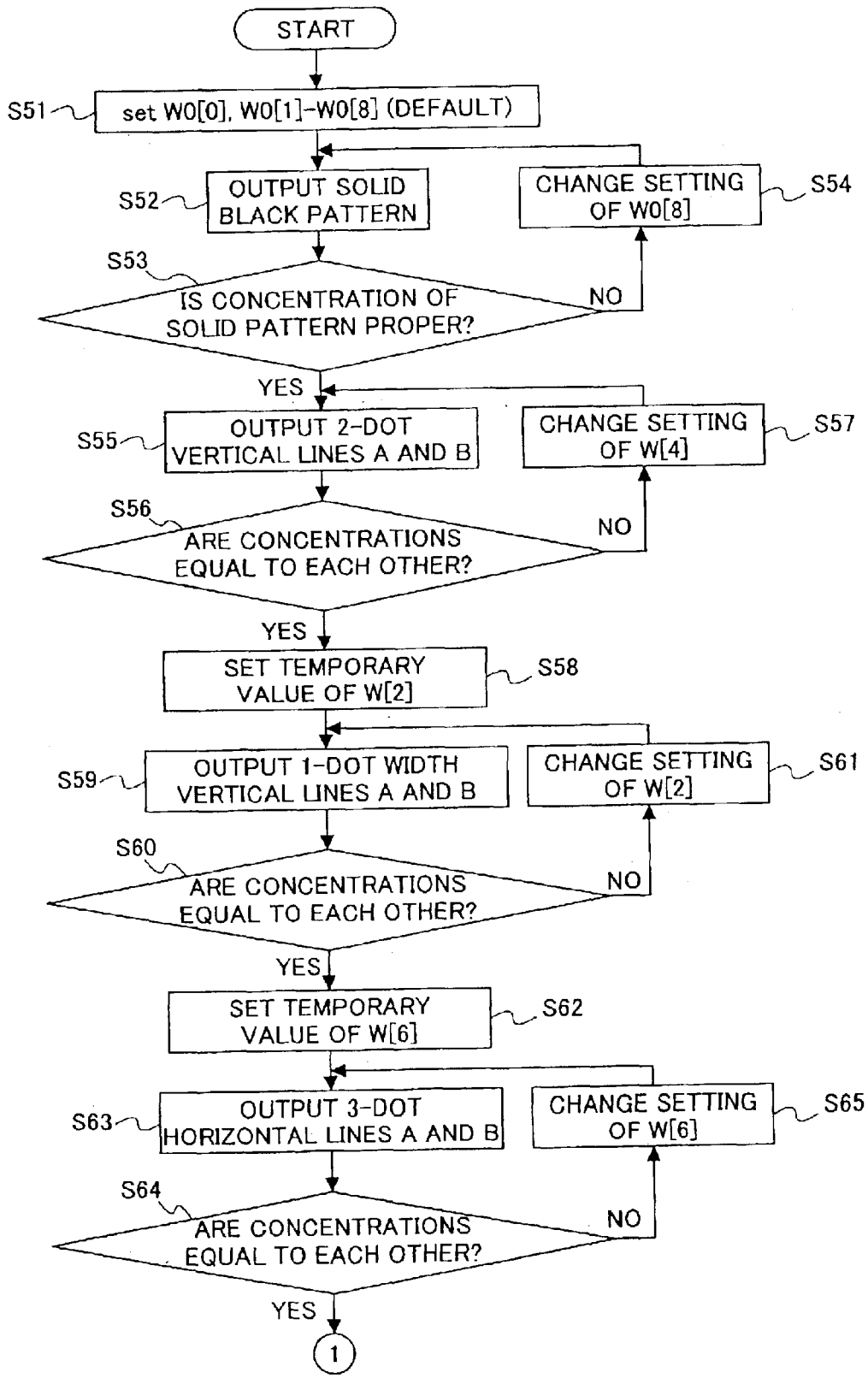
FIG. 27 is a part of a flowchart of an operation performed by the image forming apparatus according to the second embodiment of the present invention.
Figure 28:
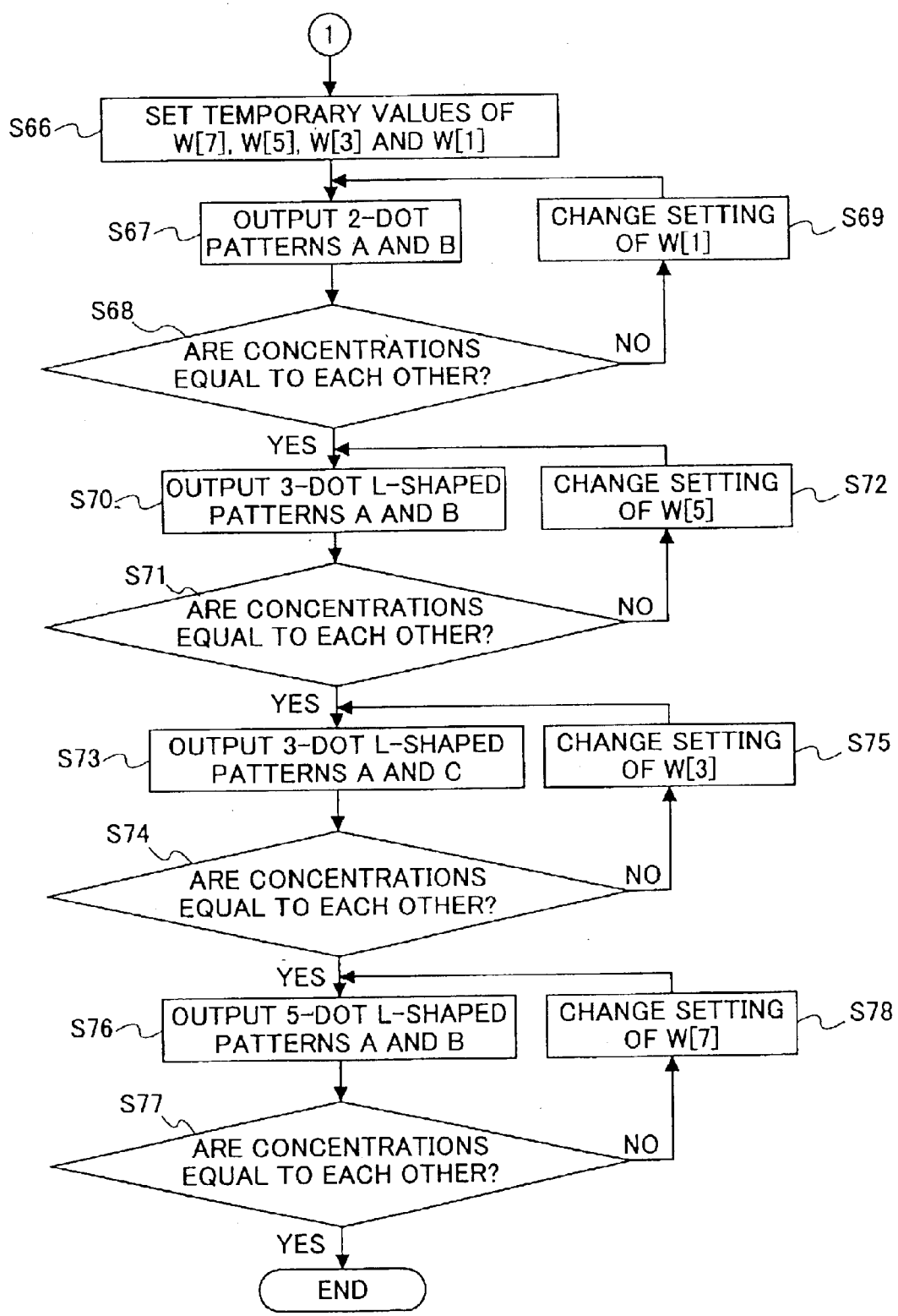
FIG. 28 is a part of a flowchart of an operation performed by the image forming apparatus according to the second embodiment of the present invention.

FIGS. 27 and 28 are parts of a flowchart of a procedure to determine the pulse width W. Although the process of FIGS. 27 and 28 can be performed in the manufacturing process of the image processing apparatus 20, the CPU 14 may automatically perform the process based on a predetermined program. W[0] to W[8] express pulse widths W corresponding to the width code c=0 to 8. Although the pulse width W[0] corresponds to a case where all the pixels within the pattern detection matrix are OFF, the pulse width W[0] is fixed as W[0]=0 since spot may be generated such as an unnecessary image drawn on the blank (white) portion when light pulses are output from the LD 6c.

First, the pulse widths W0 and W1 are set in step S51 with respect to the LUT circuit 3c. The pulse width W[0] is set to 0 (W[0]=0) and W[1]–W[8] are set as default values. An image of a pattern of a solid black image is output in step S52, and it is determined, in step S53, whether or not toner concentration is proper for the solid black image.

If it is determined, in step S53, that the measured concentration is not proper (NO of step S53), the setting of the pulse width W[8] is changed in step S54, and the routine returns to step S52. If it is determined, in step S53, that the measured concentration is not proper (YES of step S53), vertical lines having a width of 2 dots shown in FIGS. 21A and 21B are output in step S55. Then it is determined, in step S56, whether or not the vertical lines of 2-dot width shown in FIGS. 21A and 21B have the same concentration. If it is determined that the concentrations are not the same (NO of step S56), the setting of the pulse widths W[4] is changed in step S57, and the routine returns to step S55.

If it is determined that the concentrations of the vertical lines having 2-dot width shown in FIGS. 21A and 21B are the same (YES of step S56), a temporary value of W[2] is set, in step S58, by interpolation using the already set values of W[8], W[4] and W[0]. Then, vertical lines having a width of 1 dot are output in step S59. Thereafter, it is determined, in step S60, whether or not the vertical lines of 1-dot width shown in FIGS. 22A and 22B have the same concentration. If it is determined that the concentrations are not the same (NO of step S60), the setting of the pulse widths W[2] is changed in step S61, and the routine returns to step S59.

Figure 23A:
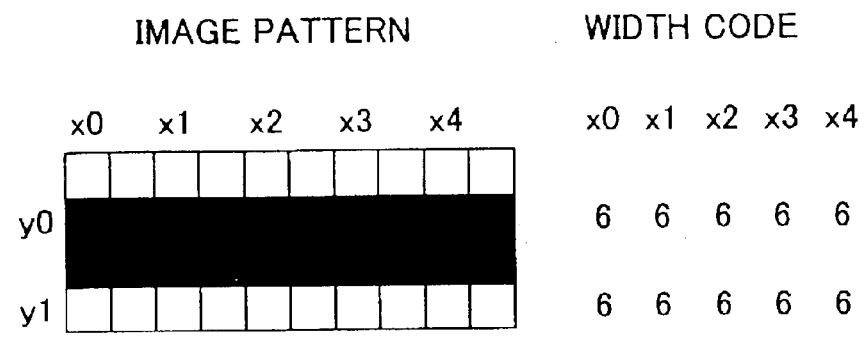
FIGS. 23A and 23B are illustrations showing image patterns of a horizontal line having 2-dot width.
Figure 23B:
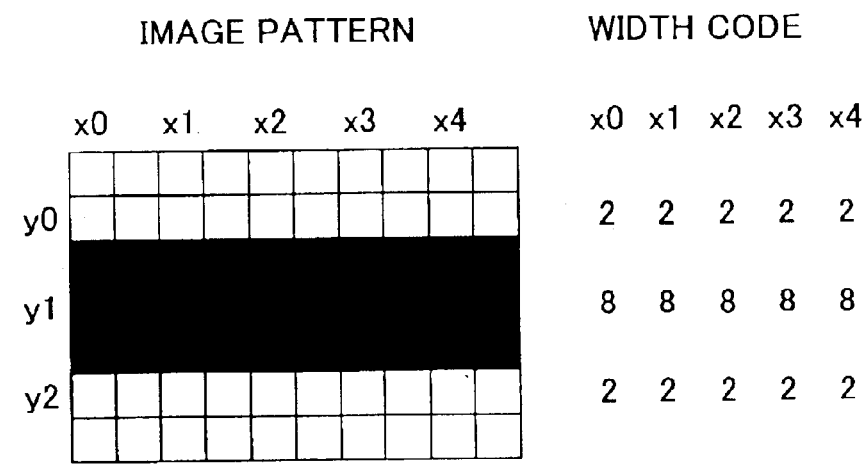

If it is determined in step S60, that the concentrations are the same (YES of step S60), a temporary value of W[6] is set, in step S62, by interpolation using the already set values of W[8], W[4], W[2] and W[0]. Then, vertical lines having a width of 3 dots shown in FIGS. 23A and 23B are output in step S63. Thereafter, it is determined, in step S64, whether or not the concentrations of the output vertical lines of 3-dot width are the same. If it is determined that the concentrations are not the same (NO of step S64), the setting of the pulse widths W[6] is changed in step S65, and the routine returns to step S62.

If it is determined that the concentrations of the 3-dot width vertical lines of FIGS. 23A and 23B are the same (YES of step S64), temporary values of W[7], W[5], W[3] and W[1] are set, in step S66, by a known interpolation method based on the previously set values of the pulse widths W[8], W[6], W[4], W[2] and W[0].

Thereafter, halftone patterns of a length of 2 dots shown in FIGS. 24A and 24B are output in step S67. Then, it is determined, in step S68, whether or not the concentrations of the 2-dot length halftone pattern are the same. If it is determined that the concentrations are not the same (NO of step S68), the setting of the pulse width W[1] is changed in step S69, and the routine returns to step S67.

If it is determined, in step S68, that the concentrations are the same, halftone patterns having L-shaped 3 dots shown in FIGS. 25A and 25B are output in step S70. Then, it is determined, in step S71, whether or not the concentrations of the 3-dot L-shaped halftone patterns shown in FIGS. 25A and 25B are the same. If it is determined that the concentrations are not the same (NO of step S71), the setting of the pulse width W[5] is changed in step S72, and the routine returns to step S70.

If it is determined, in step S71, that the concentrations are the same, halftone patterns having L-shaped 3 dots shown in FIGS. 25A and 25C are output in step S73. Then, it is determined, in step S74, whether or not the concentrations of the 3-dot L-shaped halftone patterns are the same. If it is determined that the concentrations are not the same (NO of step S74), the setting of the pulse width W[3] is changed in step S75, and the routine returns to step S73.

If it is determined, in step S74, that the concentrations are the same, halftone patterns having L-shaped 5 dots shown in FIGS. 26A and 26B are output in step S76. Then, it is determined, in step S77, whether or not the concentrations of the 5-dot L-shaped halftone patterns are the same. If it is determined that the concentrations are not the same (NO of step S77), the setting of the pulse width W[7] is changed in step S78, and the routine returns to step S76. If it is determined, in step S77, that the concentrations are the same, the routine is ended.

A pulse width data selection means and a pulse width data selection process are achieved by the CPU 14 performing the process of the flowchart shown in FIGS. 27 and 28 in accordance with a program stored in the ROM 15. Moreover, an image forming process, a determination process and a selection process are achieved by performing each process shown in FIGS. 27 and 28 in a manufacturing process of the image forming apparatus 20.

As mentioned above, the values of the pulse width shown in FIG. 7, which is used by the LUT circuit 3c, are obtained. Thus, the values are previously set as table data for the LUT circuit 3c in the manufacturing process, or when the process of FIGS. 27 and 28 is performed by the CPU 14, the CPU 14 sets the value as table data for the LUT circuit 3c. This setup achieves a data setting means and a data setting process.

Visual evaluation was made by forming images formed on a transfer material using the image forming apparatus 20 having the thus-set table data for the LUT circuit 3c. The formed images included all of the image patterns shown in FIGS. 21A through 26B and a gray scale having a halftone pattern in which the ON pixel density continuously varies. An appropriate image concentration was obtained as follows.

Concentration of a solid black part was proper.

Concentrations of the horizontal lines shown in FIGS. 22A and 22B having a 1-dot width were equal to each other.

Change in concentration of the gray scale was continuous.

Concentrations of the vertical lines having 2-dot width shown in FIGS. 21A and 21B were equal to each other.

Concentrations of the horizontal lines having 3-dot width shown in FIGS. 13A and 23B were equal to each other.

Concentrations of the halftone patterns having horizontally consecutive 2 dots shown in FIGS. 24A and 24B were equal to each other.

Concentrations of the L-shaped halftone patterns having 3 dots shown in FIGS. 25A through 25C were equal to each other.

Concentrations of the L-shaped halftone patterns having 5 dots shown in FIGS. 26A and 26B were equal to each other.

Figure 29:
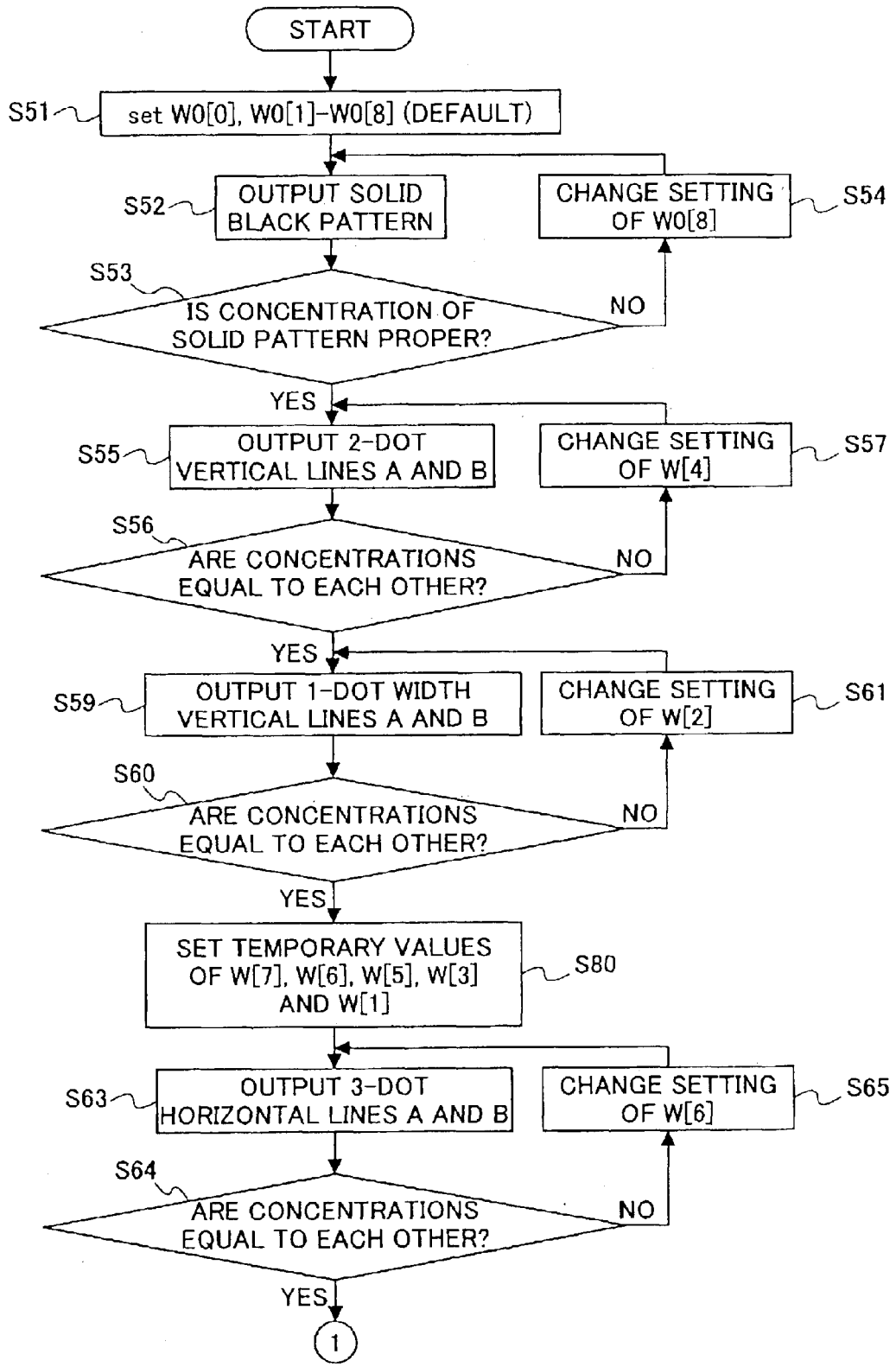
FIG. 29 is a part of a flowchart of an operation for comparison with the operation shown in FIGS. 27 and 28.
Figure 30:
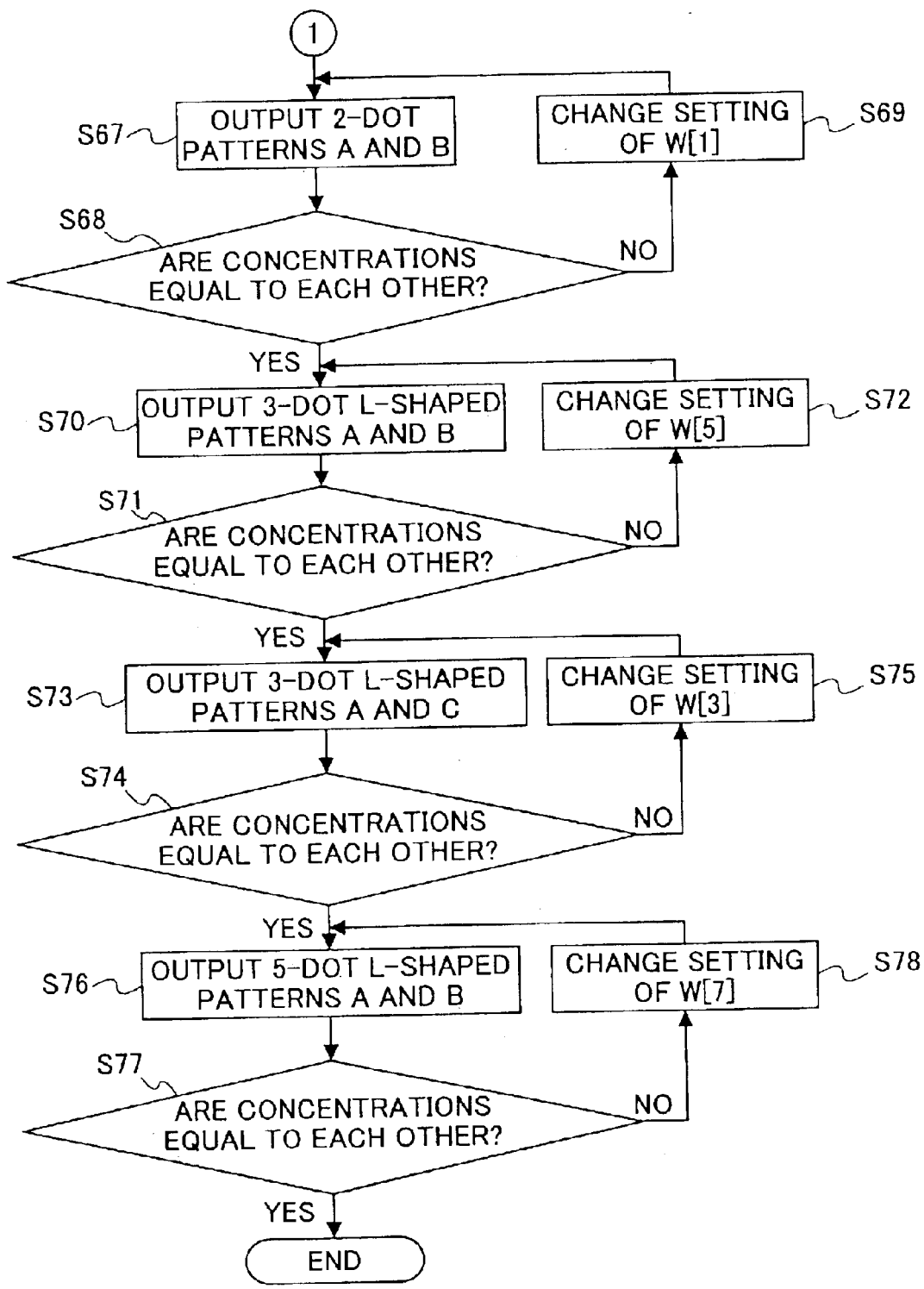
FIG. 30 is a part of the flowchart of the operation for comparison with the operation shown in FIGS. 27 and 28.

In the present embodiment, the initial value of the pulse width used for comparing concentration of W[2] is determined by interpolation using the previously determined values of W[8], W[4] and W[0]; the initial value of the pulse width used for comparing concentration of W[6] is determined by interpolation using the previously determined values of W[8], W[4], W[2], W[0]; the initial values of the pulse widths used for comparing concentrations of W[7], W[5], W[3] and W[1] are determined by interpolation using the previously determined values of W[8], W[6], W[4], W[2], W[0]. Thus, the process for determining the pulse width according to the present embodiment has less number of repetitions in comparison of concentrations for determining the pulse widths of W[2], W[6], W[7], W[5], W[3] and W[1] than the conventional process described in Japanese Patent Application No. 2001-183589 filed by the present applicants. FIGS. 29 and 30 are parts of a flowchart of the conventional process described in Japanese Patent Application No. 2001-183589. It should be noted that in FIGS. 29 and 30, steps that are the same as the steps shown in FIGS. 27 and 28 are given the same step numbers, and descriptions thereof will be omitted. It can be appreciated that the process of step S80 is performed in the conventional process instead of the process of steps S58, S62 and S66 in the present embodiment.

Similar to the above-mentioned first embodiment, the concentration detecting part 17 may be provided as shown in FIG. 31 so as to measure the reflectance of the portions of the photo conductor 51 where the image patterns (test patterns) are formed. The concentration detection part 17 comprises two toner concentration sensors 18a and 18b, which are reflection-type light sensors, and a comparator 19. Each of the toner concentration sensors 18a and 18b measures toner concentrations of two image patterns formed at different positions on the photo conductor 51 according to detection of reflectance. The comparator 19 compares the detected values of the reflection-type light sensors 18a and 18b, and outputs the result of the comparison to the CPU 14.

Additionally, similar to the above-mentioned first embodiment, the process described with reference to FIG. 19 may be performed so that an appropriate pulse width W can be selected and used in response to variation in the image forming apparatus with respect to passage of time.

The present invention is not limited to the specifically disclosed embodiments, and variations and modifications may be made without departing from the scope of the present invention.

The present application is base on Japanese priority applications No. 2002-078091 filed Mar. 20, 2002 and No. 2002-181824 filed Jun. 21, 2002, the entire contents of which are hereby incorporated by reference.

What is claimed is:

1. An image forming apparatus comprising:

a photo conductor; and an exposure device scanning a surface of the photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other, wherein the exposure device comprises:

pattern detection processing means for producing a code of a plurality of levels from image data used for performing the latent image formation in accordance with a pattern detection matrix;

pulse width setting means for setting a pulse with output from the pattern detection processing means with reference to pulse width data which designates a pulse width of each light beam previously set in response to the code of the plurality of levels; and a driver which drives each of the light-emitting elements with the pulse width set by the pulse width setting means.

2. The image forming apparatus as claimed in claim 1, wherein the pulse width data referred to by said pulse with setting means is set so that concentrations of image patterns formed by a plurality of sets of a plurality of image patterns having different relative positions with respect to said pattern detection matrix are equal to each other.

3. The image forming apparatus as claimed in claim 1, further comprising:

toner concentration sensors which detect a toner concentration of each of the image patterns formed on said photo conductor;

pulse width data selecting means for selecting a value of the pulse width data by forming the image pattern for each of sets of the plurality of image patterns having relative positions with respect to the pattern detection matrix and detecting the toner concentration of the image patterns formed on said photo conductor by said toner concentration sensors so that the detected toner concentrations are equal to each other with respect to the plurality of image patterns in each set of the image patterns; and data setting means for setting the selected pulse width data as the pulse width data referred to by said pulse width setting means.

4. The image forming apparatus as claimed in claim 3, wherein said pulse width data selecting means selects the value of the pulse width data by forming the image patterns having the same ON pixel density but different relative positions with respect to the pattern detection matrix with respect to at least three levels of said code so that the formed image patterns of the same pixel density are equal to each other; and with respect to the pulse width data corresponding to the remaining levels, said pulse width data selecting means selects the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

5. The image forming apparatus as claimed in claim 3, wherein the number of the toner concentration sensors is two, and further comprising a comparator which compares concentration values output by the two toner concentration sensors.

6. The image forming apparatus as claimed in claim 3, further comprising pulse data width updating means for performing the selection of the value of the pulse width data by said pulse width data selecting means and the setting of the pulse width data by said data setting means at a predetermined timing.

7. The image forming apparatus as claimed in claim 6, further comprising main power supply detecting means for detecting a main power supply of said image forming apparatus, and wherein said pulse data width updating means performs the selection of the value of the pulse width data by said pulse width data selecting means and the setting of the pulse width data by said data setting means at a time when the main power supply is detected.

8. The image forming apparatus as claimed in claim 3, wherein a number of said light emitting elements provided in said exposure device is two.

9. The image forming apparatus as claimed in claim 1, further comprising an image reading device which reads an image of an original document, and outputs the image data used for forming the electrostatic latent images.

10. An image forming apparatus comprising:

a photo conductor; and an exposure device scanning a surface of the photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other, wherein the exposure device comprises:

a pattern detection processing circuit for producing a code of a plurality of levels from image data used for performing the latent image formation in accordance with a pattern detection matrix;

a pulse width setting circuit for setting a pulse with output from the pattern detection processing means with reference to pulse width data which designates a pulse width of each light beam previously set in response to the code of the plurality of levels; and a driver circuit which drives each of the light-emitting elements with the pulse width set by the pulse width setting means.

11. The image forming apparatus as claimed in claim 10, wherein the pulse width data referred to by said pulse with setting circuit is set so that concentrations of image patterns formed by a plurality of sets of a plurality of image patterns having different relative positions with respect to said pattern detection matrix are equal to each other.

12. The image forming apparatus as claimed in claim 10, further comprising:
toner concentration sensors which detect a toner concentration of each of the image patterns formed on said photo conductor;
a pulse width data selecting circuit for selecting a value of the pulse width data by forming the image pattern for each of sets of the plurality of image patterns having relative positions with respect to the pattern detection matrix and detecting the toner concentration of the image patterns formed on said photo conductor by said toner concentration sensors so that the detected toner concentrations are equal to each other with respect to the plurality of image patterns in each set of the image patterns; and
a data setting circuit for setting the selected pulse width data as the pulse width data referred to by said pulse width setting circuit.

13. The image forming apparatus as claimed in claim 12, wherein said pulse width data selecting circuit selects the value of the pulse width data by forming the image patterns having the same ON pixel density but different relative positions with respect to the pattern detection matrix with respect to at least three levels of said code so that the formed image patterns of the same pixel density are equal to each other; and
with respect to the pulse width data corresponding to the remaining levels, said pulse width data selecting circuit selects the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

14. The image forming apparatus as claimed in claim 12, wherein the number of the toner concentration sensors is two, and further comprising a comparator which compares concentration values output by the two toner concentration sensors.

15. The image forming apparatus as claimed in claim 14, further comprising a pulse data width updating part which performs the selection of the value of the pulse width data by said pulse width data selecting circuit and the setting of the pulse width data by said data setting circuit at a predetermined timing.

16. The image forming apparatus as claimed in claim 15, further comprising a main power supply detecting part which detects a main power supply of said image forming apparatus, and wherein said pulse data width updating part performs the selection of the value of the pulse width data by said pulse width data selecting circuit and the setting of the pulse width data by said data setting circuit at a time when the main power supply is detected.

17. The image forming apparatus as claimed in claim 14, wherein a number of said light emitting elements provided in said exposure device is two.

18. The image forming apparatus as claimed in claim 10, further comprising an image reading device which reads an image of an original document, and outputs the image data used for forming the electrostatic latent images.

19. An image processing circuit comprising:
a pattern detection processing circuit producing a code of a plurality of levels from image data according to a pattern detection matrix;
a pulse width setting circuit setting a pulse with output from the pattern detection processing circuit with reference to pulse width data which designates a pulse width of each of light beams emitted by a plurality of light-emitting elements previously set in response to the code of the plurality of levels; and
an exposure device which perform exposure scan on a photo conductor by the light beams emitted by the plurality of light-emitting elements so as to perform an image forming operation according to an electrophotograph method,
wherein a plurality of electrostatic latent images are simultaneously performed at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof; and
the pulse width is set with respect to the plurality of light-emitting elements performing the exposure scan; and
the electrostatic latent image is formed also at a position where the plurality of light beams overlaps with each other so as to form the image with a pitch smaller than a pitch of the exposure scan in a sub scanning direction.

20. The image processing circuit as claimed in claim 19, wherein the pulse width data referred to by said pulse with setting circuit is set so that concentrations of image patterns formed by a plurality of sets of a plurality of image patterns having different relative positions with respect to said pattern detection matrix are equal to each other.

21. The image processing circuit as claimed in claim 19, wherein said pulse width setting circuit is capable of updating the pulse width data which is previously set.

22. The image processing circuit as claimed in claim 19, wherein a plurality of said pattern detection processing circuits and said pulse width setting circuits are provided in response to a number of said light-emitting elements.

23. The image processing circuit as claimed in claim 22, wherein a number of said pattern detection processing circuits is two, and a number of said pulse width setting circuits is two.

24. A processor readable program having a computer to control an image forming apparatus to perform an image forming process, said image forming apparatus comprising:
an exposure device scanning a surface of a photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other;
pattern detection processing means for producing a code of a plurality of levels from image data used for performing the latent image formation in accordance with a pattern detection matrix;
pulse width setting means for setting a pulse with output from the pattern detection processing means with reference to pulse width data which designates a pulse width of each light beam previously set in response to the code of the plurality of levels;

a driver which drives each of said light-emitting element with the pulse width set by the pulse width setting means; and toner concentration sensors which detect a toner concentration of each of the image patterns formed on said photo conductor, said program having the computer to perform:

a pulse width data selecting process for selecting a value of the pulse width data by forming the image pattern for each of sets of the plurality of image patterns having relative positions with respect to the pattern detection matrix and detecting the toner concentration of the image patterns formed on said photo conductor by said toner concentration sensors so that the detected toner concentrations are equal to each other with respect to the plurality of image patterns in each set of the image patterns; and a data setting process for setting the selected pulse width data as the pulse width data referred to by said pulse width setting means.

25. The processor readable program as claimed in claim 24, wherein said pulse width data selecting process selects the value of the pulse width data by forming the image patterns having the same ON pixel density but different relative positions with respect to the pattern detection matrix with respect to at least three levels of said code so that the formed image patterns of the same pixel density are equal to each other; and with respect to the pulse width data corresponding to the remaining levels, said pulse width data selecting means selects the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

26. The processor readable program as claimed in claim 24, wherein the pulse width data selecting process performs the selection of the value of the pulse width data when a number of the light-emitting elements of said exposure device is two.

27. A processor readable medium storing a program having a computer to control an image forming apparatus to perform an image forming process, said image forming apparatus comprising:

an exposure device scanning a surface of a photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other;

pattern detection processing means for producing a code of a plurality of levels from image data used for performing the latent image formation in accordance with a pattern detection matrix;

pulse width setting means for setting a pulse with output from the pattern detection processing means with reference to pulse width data which designates a pulse width of each light beam previously set in response to the code of the plurality of levels;

a driver which drives each of said light-emitting element with the pulse width set by the pulse width setting means; and toner concentration sensors which detect a toner concentration of each of the image patterns formed on said photo conductor, said program having the computer to perform:

a pulse width data selecting process for selecting a value of the pulse width data by forming the image pattern for each of sets of the plurality of image patterns having relative positions with respect to the pattern detection matrix and detecting the toner concentration of the image patterns formed on said photo conductor by said toner concentration sensors so that the detected toner concentrations are equal to each other with respect to the plurality of image patterns in each set of the image patterns; and a data setting process for setting the selected pulse width data as the pulse width data referred to by said pulse width setting means.

28. The processor readable medium as claimed in claim 27, wherein said pulse width data selecting process selects the value of the pulse width data by forming the image patterns having the same ON pixel density but different relative positions with respect to the pattern detection matrix with respect to at least three levels of said code so that the formed image patterns of the same pixel density are equal to each other; and with respect to the pulse width data corresponding to the remaining levels, said pulse width data selecting means selects the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

29. The processor readable medium as claimed in claim 27, wherein the pulse width data selecting process performs the selection of the value of the pulse width data when a number of the light-emitting elements of said exposure device is two.

30. A pulse width data selecting method to be applied to an image forming apparatus which performs an image forming process comprising:

an exposure device scanning a surface of a photo conductor by light beams emitted by a plurality of light-emitting elements so as to simultaneously form a plurality of electrostatic latent images at a plurality of positions on the photo conductor, a pitch of the light beams in a sub scanning direction being smaller than a beam diameter defined by a value of an intensity of the light beam at which an intensity level of each light beam is $1/e^2$ of an intensity level at a center thereof, the electrostatic latent image being formed also at a position where the plurality of light beams overlaps with each other;

pattern detection processing circuit for producing a code of a plurality of levels from image data used for performing the latent image formation in accordance with a pattern detection matrix;

pulse width setting circuit for setting a pulse with output from the pattern detection processing circuit with reference to pulse width data which designates a pulse width of each light beam previously set in response to the code of the plurality of levels;

a driver which drives each of said light-emitting element with the pulse width set by the pulse width setting circuit; and toner concentration sensors which detect a toner concentration of each of the image patterns formed on said photo conductor, said pulse width data selecting method comprising the steps of:

forming the image pattern on said photo conductor for each of sets of the plurality of image patterns having relative positions with respect to the pattern detection matrix;

determining the toner concentration of the image patterns formed on said photo conductor; and selecting a value of the pulse width data so that the toner concentrations are equal to each other with respect to the plurality of image patterns in each set of the image patterns.

31. The pulse width data selecting method as claimed in claim 30, wherein the selecting step selects the value of the pulse width data by forming the image patterns having the same ON pixel density but different relative positions with respect to the pattern detection matrix with respect to at least three levels of said code so that the formed image patterns of the same pixel density are equal to each other; and with respect to the pulse width data corresponding to the remaining levels, the selecting step selects the value of the pulse width data by obtaining a temporary value by interpolation from values of the pulse widths corresponding to the levels already determined and forming the image patterns having the same ON pixel density but different relative positions with respect to the pattern detection matrix so that concentrations of the formed test patterns of the same ON pixel density are equal to each other.

32. The pulse width data selecting method as claimed in claim 30, wherein the forming step, the determining step and the selecting step are performed when a number of the light-emitting elements of said exposure device is two.

33. An image forming apparatus forming an image on a recording medium by scanning a light beam at a sub scanning pitch smaller than a beam diameter of the light beam, the beam diameter being defined by a value of an intensity of the light beam at which an intensity level of the light beam is $1/e^2$ of an intensity level at a center thereof, said image forming apparatus comprising:

code producing means for producing a code of a plurality of levels from image data of an image to be formed according to a detection matrix;

image forming means for forming the image on the recording medium by scanning the recording medium by the light beam at a pitch smaller than the sub scanning pitch which is mechanically defined, the light beam having a pulse width being set to correspond to the code of the plurality of levels, wherein, with respect to at least three levels from among the levels to be set, the pulse width of the light beam output in response to the code of the plurality of levels is produced from image patterns having the same ON pixel density, and a plurality of test patterns having different relative position with respect to said detection matrix are formed so as to equalize concentrations of the test patterns having the same ON pixel density; and the pulse width corresponding to the remaining levels are produced from image patterns of the same ON pixel density by determining a temporary value as an initial value by interpolation using values of the pulse width corresponding to the already determined levels, and a plurality of test patterns having different relative position with respect to said detection matrix are formed so as to equalize concentrations of the test patterns having the same ON pixel density.

34. The image forming apparatus as claimed in claim 33, further comprising a plurality of concentration detecting part which measure a reflectance of a surface of said recording medium, and wherein the test patterns having a different relative position with respect to the detection matrix are formed on the surface of said recording medium so as to measure concentrations of the plurality of test patterns by the concentration detecting parts.

35. The image forming apparatus as claimed in claim 33, wherein the setting of the pulse width corresponding to the code of the plurality of levels are performed when a power supply of said image forming apparatus is turned on.

36. An image forming apparatus forming an image on a recording medium by scanning a light beam at a sub scanning pitch smaller than a beam diameter of the light beam, the beam diameter being defined by a value of an intensity of the light beam at which an intensity level of the light beam is $1/e^2$ of an intensity level at a center thereof, said image forming apparatus comprising:

a code producing part producing a code of a plurality of levels from image data of an image to be formed according to a detection matrix;

an image forming part forming the image on the recording medium by scanning the recording medium by the light beam at a pitch smaller than the sub scanning pitch which is mechanically defined, the light beam having a pulse width being set to correspond to the code of the plurality of levels, wherein, with respect to at least three levels from among the levels to be set, the pulse width of the light beam output in response to the code of the plurality of levels is produced from image patterns having the same ON pixel density, and a plurality of test patterns having different relative position with respect to said detection matrix are formed so as to equalize concentrations of the test patterns having the same ON pixel density; and the pulse width corresponding to the remaining levels are produced from image patterns of the same ON pixel density by determining a temporary value as an initial value by interpolation using values of the pulse width corresponding to the already determined levels, and a plurality of test patterns having different relative position with respect to said detection matrix are formed so as to equalize concentrations of the test patterns having the same ON pixel density.

37. The image forming apparatus as claimed in claim 36, further comprising a plurality of concentration detecting part which measure a reflectance of a surface of said recording medium, and wherein the test patterns having a different relative position with respect to the detection matrix are formed on the surface of said recording medium so as to measure concentrations of the plurality of test patterns by the concentration detecting parts.

38. The image forming apparatus as claimed in claim 36, wherein the setting of the pulse width corresponding to the code of the plurality of levels are performed when a power supply of said image forming apparatus is turned on.

* * * * *